US012323386B2

(12) United States Patent
Juneja et al.

(10) Patent No.: US 12,323,386 B2
(45) Date of Patent: Jun. 3, 2025

(54) VIRTUAL IP FOR A CONTAINER POD

(71) Applicant: Oracle International Corporation, Redwood City, CA (US)

(72) Inventors: Rohit Juneja, Stittsville (CA); Pardhiva Janardhana Krishna Munnaluru, Apex, NC (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/351,835

(22) Filed: Jul. 13, 2023

(65) Prior Publication Data

US 2025/0023844 A1 Jan. 16, 2025

(51) Int. Cl.
*H04L 61/2503* (2022.01)
*H04L 61/5007* (2022.01)

(52) U.S. Cl.
CPC .............. *H04L 61/5007* (2022.05)

(58) Field of Classification Search
None
See application file for complete search history.

(56) References Cited

U.S. PATENT DOCUMENTS

| | | | | |
|---|---|---|---|---|
| 11,316,822 B1* | 4/2022 | Gawade | ............... | G06F 9/455 |
| 11,765,244 B1* | 9/2023 | Barclay | ............... | H04L 67/51 |
| | | | | 709/226 |
| 12,155,569 B1* | 11/2024 | Cirkovic | ............... | H04L 45/66 |
| 2013/0339547 A1* | 12/2013 | Nath | ............... | H04L 61/5076 |
| | | | | 709/245 |
| 2021/0328858 A1 | 10/2021 | Asveren et al. | | |
| 2022/0038309 A1* | 2/2022 | Boutros | ............... | H04L 67/1001 |
| 2022/0116285 A1* | 4/2022 | Abdollahi Vayghan | ............... | H04L 41/0668 |
| 2022/0116310 A1 | 4/2022 | Tracy et al. | | |
| 2022/0311738 A1* | 9/2022 | Singh | ............... | H04L 61/5061 |
| 2022/0334864 A1* | 10/2022 | K N | ............... | G06F 8/61 |

(Continued)

FOREIGN PATENT DOCUMENTS

| | | | |
|---|---|---|---|
| CN | 114374696 A | * | 4/2022 |
| CN | 116155903 A | * | 5/2023 |
| EP | 3716533 A1 | | 9/2020 |

OTHER PUBLICATIONS

EBPF-based Networking, Observability, Security, Cilium-Linux Native, API-Aware Networking and Security for Containers [online], Cilium, 2022 [retrieved on Sep. 9, 2024]. Retrieved from the Internet: <URL: https://cilium.io>, 8 pages.

(Continued)

*Primary Examiner* — Christopher B Robinson

(57) ABSTRACT

Systems and methods are disclosed for implementing a virtual IP for a container pod. In certain embodiments, a method may comprise operating a cloud based network system in a containerized software environment to assign a virtual internet protocol (VIP) address to an application pod of a containerized software environment, the VIP being directly reachable from a network external to the containerized software environment. The method may include reserving a range of internet protocol (IP) addresses for use as VIP addresses, assigning a first fixed IP address to a first application pod, assigning a first VIP address from the range of IP addresses to the first application pod, and routing traffic directed to the first VIP address to the first fixed IP address.

18 Claims, 20 Drawing Sheets

(56) References Cited

U.S. PATENT DOCUMENTS

2023/0216828 A1* 7/2023 Singh ................. H04L 69/40
709/245
2024/0126581 A1 4/2024 Nguyen et al.
2024/0406277 A1* 12/2024 Henkel ................. H04L 41/40

OTHER PUBLICATIONS

GitHub: lyft/cni-ipvlan-vpc-k8s: AWS VPC Kubernetes CNI driver using IPvlan [online], Lyft, 2022 [retrieved on Sep. 9, 2024]. Retrieved from the Internet: <URL: https://github.com/lyft/cni-ipvlan-vpc-k8s>, 11 pages.

International Search Report and Written Opinion for PCT App. No. PCT/US2024/037641, Authorized Officer Agudo Cortada, E., mailed Sep. 30, 2024, 15 pages.

International Search Report and Written Opinion in PCT/US2023/021685, mailed Aug. 31, 2023, 9 pages.

Jain R, Paul S. Network virtualization and software defined networking for cloud computing: a survey. IEEE Communications Magazine. Nov. 11, 2013;51(11):24-31.

Life of a Packet, Cilium Documentation, [online], 2021 [retrieved on Sep. 9, 2024]. Retrieved from the Internet: <URL: https://web.archive.org/web/20210417121721/https://docs.cilium.io/en/latest/concepts/ebpf/lifeofapacket>, 5 pages.

Mastering Kubernetes, Book [online], Sayfan G., 2017 [retrieved on May 2017]. Retrieved from the Internet: <URL: http://196.189.45.87/bitstream/123456789/40210/2/115.Gigi%20Sayfan.pdf>.

Oracle Cloud Infrastructure Service Mesh Documentation [online], Oracle Corporation, 2024 [retrieved on Sep. 9, 2024]. Retrieved from the Internet: <URL: https://docs.oracle.com/en-us/iaas/Content/service-mesh/home.htm>, 2 pages.

Oracle Cloud Infrastructure Service Mesh, Datasheet [online], Oracle Corporation, 2024 [retrieved on Sep. 9, 2024]. Retrieved from the Internet: <URL: https://www.oracle.com/cloud/cloud-native/service-mesh/>, 7 pages.

Wang, Xiaomin, "Orchestrating data governance workloads as stateful services in cloud environments using Kubernetes Operator Framework," Master Thesis, University of Stuttgart, Dec. 9, 2022, 85 pages.

* cited by examiner

VIRTUAL IP FOR A CONTAINER POD

TECHNICAL FIELD

Various embodiments of the present technology generally relate to improvements to internet protocol (IP)-based communications capabilities of a software container environment, such as Kubernetes® (sometimes stylized as K8s). More specifically, embodiments of the present technology relate to systems and methods for improved network functionality in a cloud based environment, such as to implement a session border controller (SBC).

BACKGROUND

Mobile communications, including cellular and voice over internet protocol (VOIP), are a fundamental aspect of modern society. The infrastructure used to support mobile communications may include many components and network functions, which may need to meet high standards in data and media throughput, failover handling, performance, and reliability. One such network function may include a session border controller (SBC), which may include special purpose components used to regulate and protect internet protocol (IP) communication flows, such as internet telephony and IP video streams. However, components such as SBCs used in mobile communication networks traditionally include large, expensive equipment that may be difficult to maintain or scale according to need.

Moving communications infrastructure functionality from hardware-based implementations to software-defined networking can alleviate some of these difficulties. Containerized software deployment and orchestration systems such as Kubernetes are a popular method for deploying software systems in a cloud environment, enabling companies to quickly and easily scale required resources at hosted cloud servers. Rather than making extensive changes to private server infrastructure for a communications network, communications service providers using cloud-based deployment could scale their services more freely and quickly.

However, systems such as Kubernetes have significant limitations when it comes to providing mobile communications services and similar network functions. These limitations may include limited media throughput, lack of availability of reliable and consistent IP addresses, lack of uniformity of ingress and egress communication paths, and limited failover capabilities to maintain high-availability (HA) uninterrupted service in the event of a component failure during a communication session. Accordingly, there exists a need for improved implementations of cloud-based network functions.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for implementing a virtual IP for a container pod. In an embodiment, a cloud based network system may comprise one or more processors, and a memory having stored thereon instructions that, upon execution by the one or more processors, cause the one or more processors to implement a process to assign a virtual internet protocol (VIP) address to an application pod of a containerized software environment, the VIP being directly reachable from a network external to the containerized software environment. The cloud based network system may reserve a range of internet protocol (IP) addresses for use as VIP addresses, assign a first fixed IP address to a first application pod, assign a first VIP address from the range of IP addresses to the first application pod, and route traffic directed to the first VIP address to the first fixed IP address.

In some embodiments, the cloud based network system may determine when the first application pod has restarted as a new application pod, assign a new fixed IP address to the new application pod, and assign the first VIP address to the new application pod, the first VIP address configured to route traffic to the new fixed IP address. In some examples, the cloud based network system may assign a virtual network interface controller (Vnic) to the first application pod to act as an externally-accessible port not managed by the containerized software environment, assign the first fixed IP address to the Vnic, and assign the first VIP address to the Vnic in order to route traffic directed to the first VIP address to be received at the first fixed IP address. The cloud based network system may assign the first application pod to an active role, assign a second fixed IP address to a second application pod, assign the second application pod to a standby role, and switch the second application pod from the standby role to the active role in response to the first application pod crashing. In some embodiments, the cloud based network system may determine when the first application pod has crashed, and in response to the first application pod crashing, assign the first VIP address to the second application pod, the first VIP address configured to route traffic to the second fixed IP address. This cloud based network system may operate the cloud based network system on a public cloud environment, request that a public cloud operator associate the first VIP address with the first application pod, and in response to the first application pod crashing, request that the public cloud operator associate the first VIP address with the second application pod. In another example embodiment, the cloud based network system may assign the first VIP address to the second application pod, route traffic directed to the first VIP address to the first fixed IP address while the first application pod is running, and route traffic directed to the first VIP address to the second fixed IP address in response to the first application pod crashing. This cloud based network system may operate the cloud based network system on a private cloud environment, and route traffic directed to the first VIP address to be received at the first fixed IP address or the second fixed IP address based on a gratuitous address resolution protocol (GARP). The cloud based network system may further assign a third fixed IP address to a third application pod, and assign the first VIP address to the first application pod, to the second application pod, and to the third application pod, the first application pod and the third application pod both being in the active role and the second application pod being in the standby role. The cloud based network system may assign a second VIP address to the first application pod, to the second application pod, and to the third application pod, route traffic to the first fixed IP address and the third fixed IP address via the first VIP address and the second VIP address while both first and third application pods are active based on the GARP, and when either the first application pod or the second application pod crashes, route traffic intended for the crashed pod to the second fixed IP address based on the GARP. In some examples, the containerized software environment may include a Kubernetes cluster.

In certain embodiments, a method may comprise operating a cloud based network system in a containerized software environment to assign a virtual internet protocol (VIP) address to an application pod of a containerized software environment, the VIP being directly reachable from a network external to the containerized software environment. The method may include reserving a range of internet protocol (IP) addresses for use as VIP addresses, assigning a first fixed IP address to a first application pod, assigning a first VIP address from the range of IP addresses to the first application pod, and routing traffic directed to the first VIP address to the first fixed IP address.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein.

Figure 1:
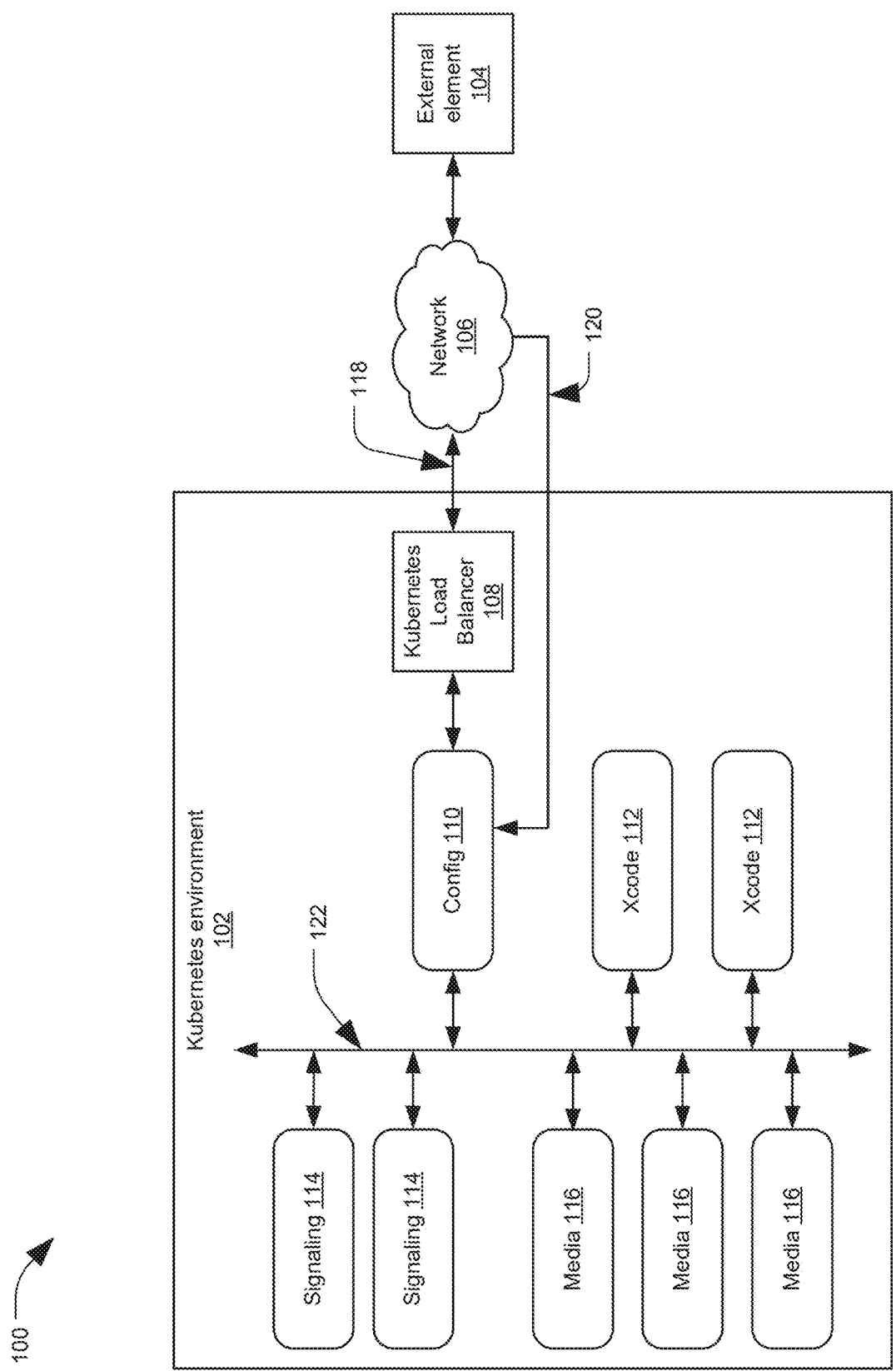
FIG. 1 is a diagram of a system configured to implement a virtual IP for a container pod, in accordance with certain embodiments of the present disclosure.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 depicts a diagram of a system 100 configured to implement a virtual IP for a container pod, in accordance with certain embodiments of the present disclosure. The system 100 may include one or more Kubernetes containerized software environments 102, one or more external elements 104, and one or more networks 106. The Kubernetes environment 102 may include a load balancer module 108, and one or more microservices, applications, or computing pods, such as configuration module 110, transcoding (xcode) module 112, signaling module 114, and media module 116. The modules within Kubernetes environment 102 may communicate via an internal pod networking path 122. Elements of the Kubernetes environment 102 may be connected to external network 106 via an ingress path 118 into the Kubernetes environment 102, and an egress path 120 out of the Kubernetes environment. Elements of system 100 may be implemented via computers, servers, hardware and software modules, or other system components. Elements of system 100 may also include or have access to one or more data storage devices, data storage mediums, data storage servers, and related data structures such as databases, which may store data files, executable code, or other information.

In Kubernetes environment 102, applications or microservices may be executed by pods, which may be a unit of computing. In system 100, various microservices, such as config 110, transcoding 112, signaling 114, and media 116, may be executed on one or more pods in the Kubernetes environment 102. These microservices may be used for managing and processing communication streams for a mobile communications network provider. For example, external element 104 may include a communications device or networking component involved in a communication session. Media from external element 104 may be transmitted via network 106 (e.g., the internet or some other data network external to the Kubernetes environment 102) along an ingress path 118 to the Kubernetes environment 102.

The ingress path 118 may pass through a Kubernetes load balancer 108, before the communications messages are provided to a pod or application such as config module 110. The load balancer 108 may perform processing on incoming messages to distribute workload among resources within the Kubernetes environment 102, and in a default Kubernetes setup may always be situated along the ingress path 118 for network communications. From the perspective of a mobile communications service provider, the additional overhead of the load balancer 108 may be undesirable for real-time transport protocol (RTP) and user datagram protocol (UDP) traffic. Data from network 106 intended for a particular microservice 110-116 may need to go through load balancer 108 first, and potentially be routed through Kubernetes' internal pod network 122. Pods may only have one interface (e.g., to Kubernetes pod network 122), and trusted and untrusted segregation cannot be implemented at the network level. Therefore, external communications (e.g., from network 106) may not be able to reach a desired microservice or pod directly. IP addresses for pods may be ephemeral (e.g., generated based on a need and dissolved afterward), so that it is not known ahead of time what the IP address for a pod will be, and if the pod or application is restarted, the IP address may change. The default Kubernetes pod interface may be low capacity and not suited for media traffic, such as VOIP and IP video communications streams, and may not run accelerated networking technologies such as single root I/O virtualization (SR-IOV or SRIOV) or data plane development kit (DPDK). Further, messaging exiting the Kubernetes environment 102 may be along an egress path 120 different than the ingress path 118, bypassing the load balancer 108.

In order to effectively provide mobile communications network services on a cloud-based environment such as Kubernetes 102, many aspects of the arrangement of system 100 may be improved. Additional interfaces may be added to application pods to provide capabilities not provided by the Kubernetes cluster. A mechanism may be provided where external work or messaging (e.g., from network 106) can reach microservices 110-116 directly via externally reachable IP support, and the IP address for the microservices can be known beforehand. For example, a known IP address reachable from an external network may be used in handling a session initiation protocol (SIP) phone call, where a signaling path will be set up. The IP address for microservices may be configured to stay consistent even after the pod or microservice restarts or fails. A same ingress and egress path may be provided via a direct connection between pods and external networks 106. An example use case may include handling media packets in RTP communications, where media packets should come in and go out along the same media path. The additional interfaces may provide support for virtual IP (VIP) addressing. With the additional interfaces and associated handling described herein, a mobile communications service provider may handle high-throughput media and packet-routing via a cloud application in a system such as Kubernetes. These improvements may apply to various networking and protocol types having similar requirements, such as 4G, 5G, internet of things (IoT), SIP, Diameter, RTP, real-time transport control protocol (RTCP), internet protocol security (IPsec), internet key exchange (IKE), etc. An example system implementing these modifications is shown in FIG. 2.

Figure 2:
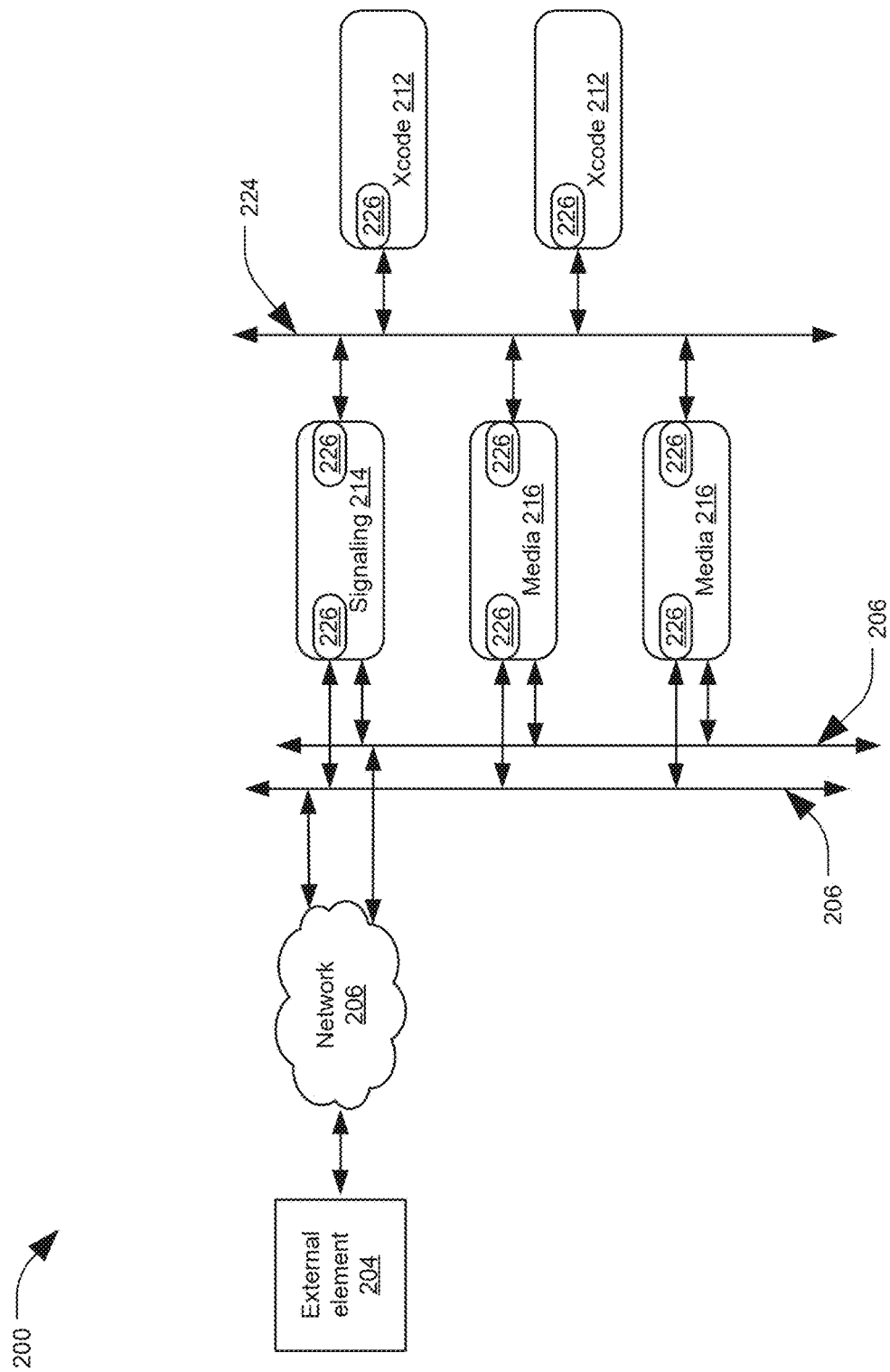
FIG. 2 is a diagram of a system configured to implement a virtual IP for a container pod, in accordance with certain embodiments of the present disclosure.

FIG. 2 depicts a diagram of a system 200 configured to implement a virtual IP for a container pod, in accordance with certain embodiments of the present disclosure. In particular, the system 200 may depict an embodiment in which containerized applications or pods have additional interfaces added, enabling direct connection with external networks that is not controlled by a containerized application system such as Kubernetes. The system 200 may include an external element 204 (e.g., a SIP peer), one or more external networks 206, and a plurality of containerized applications or microservices running on pods, such as transcoding module 212, signaling module 214, and media module 216. Further, the additional interfaces may enable modules 212-216 to communicate via an internal network 224, which may be different from the Kubernetes pod network 122 of FIG. 1.

The additional interfaces may be implemented via virtual network interface controllers or cards (Vnics) 226 that are not directly managed by Kubernetes. The Vnics 226 enable bypassing the Kubernetes infrastructure and limitations encompassed by it. Pods or microservices 212-216 with Vnics 226 can communicate directly with external networks 206 via consistent ingress and egress paths, without going through the Kubernetes load balancer 108. Further, the Vnics can be assigned persistent VIPs that may be known before instantiation of a pod or microservice 212-216 and remain consistent even if the pod or microservice is restarted.

The implementation of Vnics may be automated and controlled via one or more operators added to a control plane of the Kubernetes environment, or similar control system of other containerized software systems. An automated solution may be implemented via one or more operators configured to know what application to initiate, how to initiate it, what additional resources the application needs, on and which node the application will be spawned. On that node, the one or more operators may create the required network interface, inject it to the appropriate pod or application and associate a virtual IP, while bypassing the limitations of the Kubernetes system. An example implementation is described in regard to FIG. 3.

Figure 3:
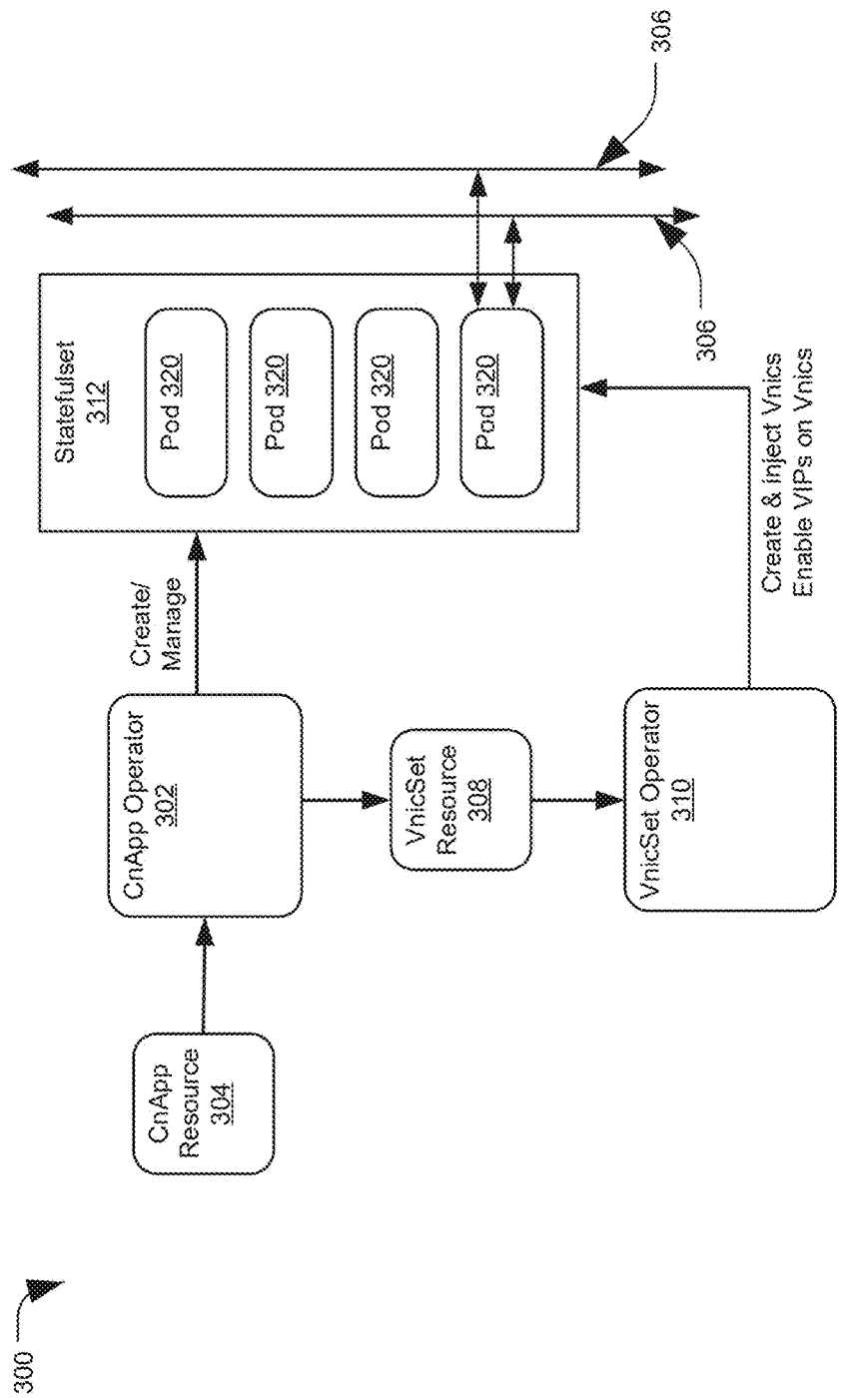
FIG. 3 is a diagram of a system configured to implement a virtual IP for a container pod, in accordance with certain embodiments of the present disclosure.

FIG. 3 depicts a diagram of a system 300 configured to implement a virtual IP for a container pod, in accordance with certain embodiments of the present disclosure. In particular, the system 300 may depict an embodiment in which custom operators in a containerized software environment manage the addition of interfaces to applications or pods. The system 300 may include a cloud native application (CnApp) operator 302, a CnApp resource 304, a VnicSet operator 306, a VnicSet resource 308, a StatefulSet 312 including a plurality of pods 320, and one or more external networks 306 not managed by a containerized software environment such as Kubernetes.

A StatefulSet 312 may be an example Kubernetes workload application program interface (API) object used to manage stateful applications, where pods 320 created from a same spec each has a persistent identity, rather than being interchangeable. In some examples, each pod 320 in a StatefulSet 312 may be of the same type (e.g., a media pod 216 of FIG. 2), with different StatefulSets 312 for different types of pods 320 or applications.

The externally reachable Vnic interfaces proposed herein may function for StatefulSets 312, as well as pods 320 generally, deployments, jobs, and similar resources. The interfaces may allow pods 320 to be reachable via external networks 306 not managed by Kubernetes through consistent ingress and egress paths, and using predictable and fixed VIPs.

In Kubernetes, an operator may be a method of packaging, deploying and managing an application in Kubernetes. An operator may be an application-specific controller that extends the functionality of the Kubernetes API to create and manage applications for a user, and may include application-specific information to automate the entire lifecycle of the software it manages. Operators may be custom Kubernetes controllers that use custom resources (CR), providing settings for values defined within a custom resource definition (CRD) file (which may refer to any form of resource definition data and not strictly to file system files), to manage applications and their components. The CRs may provide high-level configuration and settings, which an operator may translate into low-level actions based on logic embedded within the operator. An operator may watch a particular CR type and take application-specific actions to bring a current state of managed applications into alignment with a desired state specified in the resource. The example cloud based SBC (cbSBC) or cloud native SBC (cnSBC) solution supported by Vnics as described herein may be managed by two example custom operators: the CnApp operator 302, and the VnicSet operator 306. A custom operator may be invoked or initiated by an administrator or user providing a definition file for the operator and executing it at the Kubernetes control plane (e.g., via an apply command), causing the control plane to create and run the operator.

The CnApp operator 302 may manage one or more applications and pods 320, such as the media applications, signaling applications, transcoding applications, etc. described in regard to FIGS. 1-2, the StatefulSet(s) 312, or other application deployments or instances. The CR for CnApp operator 302 may be the CnApp resource 304, which may be submitted by a user to define the application to be managed by the CnApp operator 302. Once active, the CnApp operator 302 may watch for the CnApp resource 304, and may create the desired application (e.g., as implemented through StatefulSet 312 and pods 320). The CnApp resource 304 may also define what Vnic resource requirements the created applications and associated pods 320 have. Based on the Vnic resource requirements, the CnApp operator 302 may create a VnicSet resource 308 yaml definition file, which may indicate required Vnic resources for the created StatefulSet 312 and pods 320.

The VnicSet operator 310 may be configured to detect a VnicSet resource create event (e.g., triggered by the CnApp operator 302 generating the VnicSet resource CRD file), causing the VnicSet operator 310 to create the VnicSet resource 308 objects themselves. The VnicSet resource 308 objects may be the mechanism by which the VnicSet operator 310 assigns or injects the Vnics onto the pods 320, and enables VIPs on the Vnics for interfacing with the external network 306. The resource files for the pods 320 (e.g., the CnApp resource 304) may include references to the corresponding VnicSet resources 308. Accordingly, the CnApp operator 302 and the VnicSet operator 310 may work in unison to implement the cnSBC as described herein.

The solutions for implementing Vnics and VIPs may differ depending on whether the implementation is for private networks (e.g., via OpenStack) or public cloud environments, such as using OCI (Oracle Cloud Infrastructure), AWS (Amazon Web Services), and Microsoft Azure. Example implementations for both scenarios are described herein. In an implementation, a three-part solution may include: 1) the CnApp operator 302 bringing up application pods 320 (e.g., based on CnApp resource 304) and creating a trigger event for Vnic creation through the generation of VnicSet resource 308 definition file; 2) VnicSet operator 310 handling the trigger event, and creating and injecting the Vnics onto the pods 320; and 3) the VnicSet operator 310 enabling VIP support on the Vnics, enabling switchover or failover scenarios between pods 320 with fixed VIPs that are always reachable from external networks 306. As the CnApp operator 302 and VnicSet operator 310 may work in conjunction to implement the network solutions described herein, they may be jointly referred to as a Netverse operator. The Netverse operator may provide a complete automated solution for management of network applications with virtual IPs (VIP), high availability (HA), and dynamic service management. An example architecture of a Kubernetes system configured to implement the solutions described herein is described in regard to FIG. 4.

Figure 4:
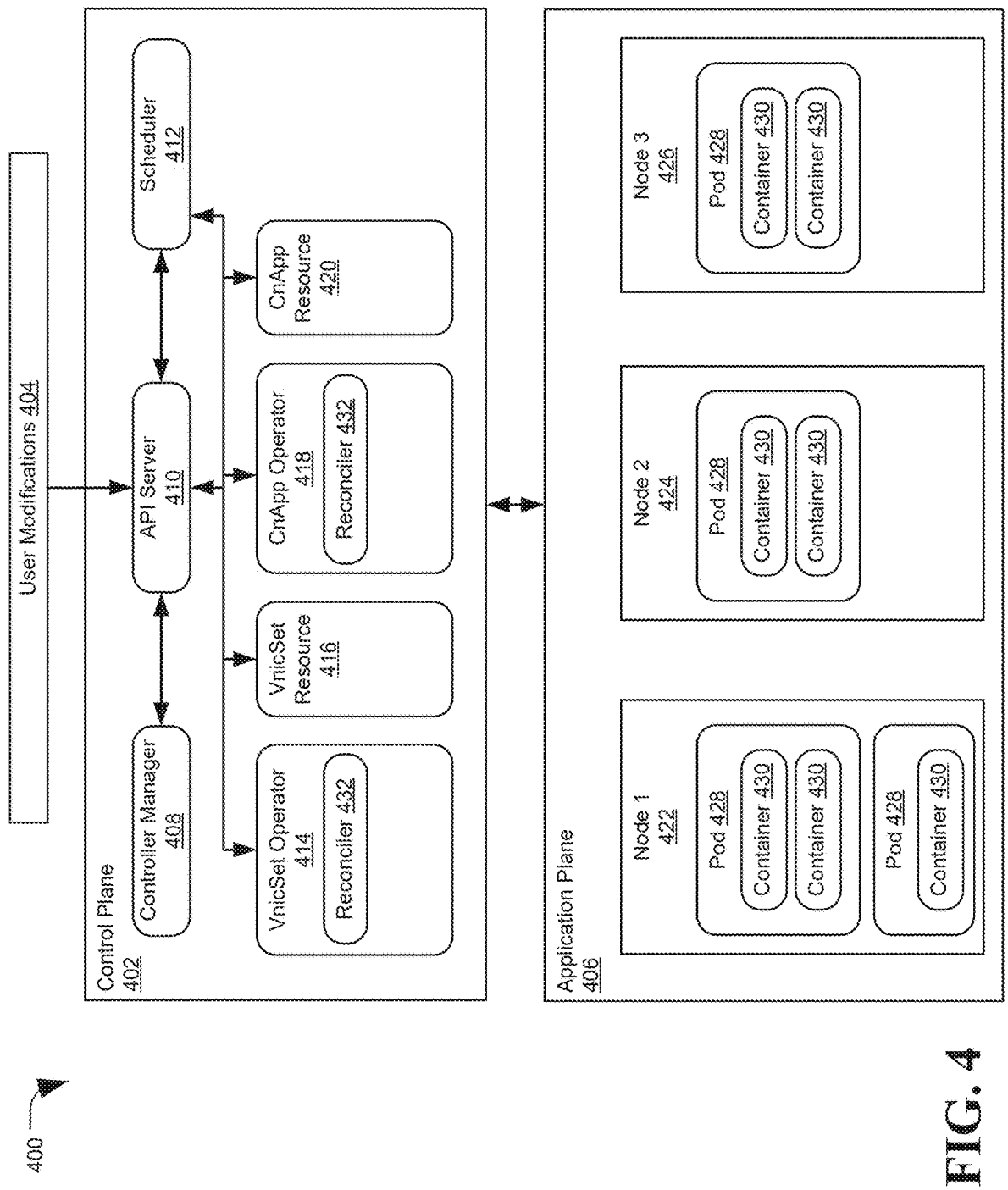
FIG. 4 is a diagram of a system configured to implement a virtual IP for a container pod, in accordance with certain embodiments of the present disclosure.

FIG. 4 depicts a diagram of a system 400 configured to implement a virtual IP for a container pod, in accordance with certain embodiments of the present disclosure. In particular, the system 400 may depict an example Kubernetes architecture employing custom operators for implementing a cnSBC. The system 400 may include a control plane 402, which may receive user modifications 404 and implement those modifications and create and manage applications in an application plane 406. The control plane 402 may include a controller manager 408, an API server 410, a schedule 412, a VnicSet operator 414, a VnicSet resource 416, a CnApp operator 418, and CnApp resource 420. The application plane 406 may include a plurality of worker nodes or hosts, including node 1 422, node 2 424, and node 3 426. Each node 422-426 may include one or more pods 428, each of which may include one or more containers 430. Although depicted as part of control plane 402, elements such as VnicSet operator 414 and CnApp operator 418 may be executed on worker nodes 422-426, and may be configured to hook into the control plane 402 to extend the functioning of the control plane. System 400 may correspond to systems described in FIGS. 2-3.

When Kubernetes is deployed, a cluster is provided that includes one or more worker machines called nodes 422-

426. Each node 422-426 can host one or more pods 428, which may be the smallest deployable unit of computing that can be managed in Kubernetes. Each pod 428 can run one or more containers 430, which may be a bundle of software and all its dependencies (e.g., an application or microservice). Through nodes 422-426 and pods, Kubernetes can manage the resources needed to execute, expand, and manage applications or services in a cloud environment. These applications and resources may be managed via components running in the control plane 402.

The control plane 402 may be a container orchestration layer that exposes the API and interfaces to define, deploy, and manage the lifecycle of containers 430, as well as the nodes 422-426 and pods 428 on which the containers 430 run. Only a selection of example systems that may be included in the control plane 402 is depicted in system 400.

API server 410 may provide a front end for the control plane 402, through which all other components may interact. The API server 410 may expose the Kubernetes API, and receive user modifications 404 and other input. User modifications 404 may be received in the form of kubectl command line interface (CLI) instructions, which may include defining objects through yaml or json files. The API server 410 may validate and configure data for the API objects, including pods 428.

The controller manager 408 may run controller processes, where a controller may be a control loop that watches a shared state of the cluster through the API server 410 and makes changes to move the current state towards a desired state (which may be specified through user modifications 404, for example). The controller manager 408 may run controller processes for default Kubernetes controllers, as well as for controllers implemented by custom operators (e.g., VnicSet operator 414 and CnApp operator 418). Accordingly, the controller manager 408 may implement the management functions controlled by custom operators such as the VnicSet operator 414 and CnApp operator 418.

The scheduler 412 may watch for newly created pods 428 or other resources with no assigned node 422-426, and may select a node for the resources to run on. Decisions for which node 422-426 to assign a newly created pod 428 may be based on resource requirements and availability (e.g., based on workload distribution for the nodes), data locality, and other factors. Operators responsible for the creation of pods 428 (e.g., CnApp operator 418) may also influence or control which node 422-426 a pod is assigned to.

As described in regard to FIG. 3, a Kubernetes operator may be a method of packaging, deploying and managing an application in Kubernetes. An operator may implement a custom controller to manage applications according to values defined in custom resources (CR) (e.g., VnicSet resource 416 and CnApp resource 420). In some embodiments, operators (e.g., VnicSet operator 414 and CnApp operator 418) may run in the worker nodes 422-426. Because operators may implement controllers in the worker nodes 422-426, but controllers may run in the control plane 402, operators may effectively extend the control plane 402 into the worker nodes 422-426. An operator may add itself to the controller manager 408 list, thereby extending the list to the application plane 406, and may start monitoring the operator's resources via the API server 410.

An application pod 428 may be created as part of the StatefulSet 312 resource. The scheduler 412 may decide which node 422-426 to assign the pod 428 based on resource availability. The controller manager 408 may be listening to the API server 410 for resources it is subscribed for. If the StatefulSet 312 resource is modified, the change notification may trigger an event with the controller manager 408 which invokes the corresponding controller method for that resource to bring the resource back to the desired state from the current state.

When a custom operator (e.g., VnicSet operator 414 and CnApp operator 418) adds a hook to the controller manager 408, the controller manager will monitor the API server 410 for changes to a custom resource (e.g., VnicSet resource 416 or CnApp resource 420) associated with the custom operator, such as create, modify, or delete notifications. Any notification may indicate that a state of the custom resource has changed (e.g., changes to either the desired state or current state may result in a determination that the current state and desired state do not match), and triggers to the API server 410. Based on the notification, the controller manager 408 can execute a controller action onto the custom resource to bring the current state and the desired state of the application pod back into equilibrium. Essentially, an operator may add an endpoint to the Kubernetes API called a custom resource (CR), along with a control plane 402 component or hook that monitors and maintains resources of the new type. A custom operator may comprise a reconciler 432 module or process, which may direct the controller manager 408 on how to bring a custom resource from a current state to a desired state.

Accordingly, an operator may include the reconciler 432 as part of the controller method, which may continually loop to determine a state of an associated custom resource (e.g., the VnicSet operator 414, by way of the reconciler 432 and controller manager 408, may continually monitor the state of the VnicSet resource 416 through API server 410). Whenever a change event happens for the custom resource (e.g., based on user modifications 404), the operator may receive a notification. The operator may then adjust the state of the custom resource to bring it from the current state to the desired state. In case of any error or other failure to bring the custom resource to the desired state, the operator and reconciler 432 may continue in a loop to execute a particular set of operations until the custom resource reaches the desired state.

One part of an example three-part solution for implementing a cnSBC, as described in regard to FIG. 3, included the CnApp operator 418. The CnApp operator 418 may be configured to manage its own requirements, as well as to create, monitor, and manage the application pods 428 and their associated resources. Additionally, the CnApp operator 418 may dynamically create, update, delete, and apply the VnicSet resource 416 definition file, when the pods 428 are created, updated, or deleted. The VnicSet operator 414 may then act on those change notifications to the VnicSet resource 416. For example, based on change notifications to the VnicSet resource 416 from CnApp operator 418, the VnicSet operator 414 may create and inject Vnics to nodes 422-426 or pods 428, or enable VIPs on Vnics associated with pods 428.

The CnApp operator 418 may be configured to dynamically scale the applications and associated resources (e.g., changing a number of pods from four to two, or from four to six, etc.). The CnApp operator 418 may adjust the VnicSet resource 416 based on the scaled number of pods or other resources. The adjusted VnicSet resource 416 may trigger an event causing the VnicSet operator 414 to adjust a number of Vnics inserted at the nodes 422-426 (e.g., increasing a number of Vnics when a number of pods 428 are scaled up, and deleting and removing Vnics when a number of pods 428 are scaled down).

The CnApp operator 418 may manage StatefulSet or Deployment of pods 428 and other similar resources with multiple replicas. For example, CnApp operator 418 may also handle persistent volume claims (PVCs) for storage resources, ConfigMaps, Secrets, or other resources. It may support all constructs and attributes of Kubernetes resources in a custom bundle (e.g., Node Selector, Image, replica, ContainerPort, etc.), as part of its own definition manifest file. The CnApp operator 418 may also create a Service (a method to make an application running on a set of pods 428 available on a network so that clients can interact with it) and manage association of Services with pods 428. The Service could be of a default type (e.g., ClusterIP, NodePort, Loadbalancer, Headless, etc.), or a unique or custom Service. A created Service may be associated with a particular resource (e.g., StatefulSet 312) including multiple pods 428, or may be associated with individual pods 428. For example, a per-pod Service may be specified in the CnApp operator definition file (used in the creation of the CnApp operator 418 itself), so that if a StatefulSet 312 with four pods is created, a Service would be associated with each of the four pods. If pods 428 are scaled up or scaled down, the CnApp operator 418 may scale up or scale down corresponding Services dynamically.

Kubernetes has mechanisms for managing application pods that work on its default resources, such as StatefulSet, Deployment, ReplicaSet, Jobs, etc. However, the CnApp operator 418 may work on its own custom resource, the CnApp resource 420. The CnApp resource CRD yaml file may be provided via a user submission or modification 404 to instruct the CnApp operator 418 on how to configure an application deployment (e.g., with StatefulSet and replica counts for pods, IP addresses to assign to Vnics injected into pods, and other details). The CnApp operator 418 may use the CRD to generate the CnApp resource 420 itself. The CnApp resource 420 may integrate any resources needed for the managed application to work, such as StatefulSet, Service, PVC, ConfigMap, Secrets, etc. So returning to FIG. 3, a CnApp application may include four pods 320 of type StatefulSet 312. If the CnApp application is to be scaled up from four pods 320 to six, it would not involve just scaling up the StatefulSet 312 (a default Kubernetes resource), it would involve scaling up the CnApp resource 304. Scaling up the CnApp resource 304 may include scaling up the StatefulSet 312 replica size from four to six (for two additional pods 320), plus two additional PVCs, two additional Services, two additional ConfigMaps, additional Secrets, etc. So all resources that make an application a complete independent box. The CnApp operator 302 may be configured to scale up or down all the associated resources together, based on the CnApp resource 304.

Returning to FIG. 4, in addition to managing (e.g., create, watch, delete) an application and its associated pods 428 and resources, the CnApp operator 418 may also dynamically create, delete, and update the VnicSet resource 416 custom resource definition (CRD) yaml file, and associate it with an application resource like StatefulSet, Deployment, etc. Similarly, the CnApp operator 418 may trigger events for the creation or deletion of VnicSet resources 416 based on the VnicSet resource CRD and requirements of the managed application. These events may cause the VnicSet operator 414 to create the VnicSet resource 416 itself, and inject a Vnic into a pod 428 based on the VnicSet resource 416. Together, the CnApp operator 418 and the VnicSet operator 414 enable management of pods 428 as part of a StatefulSet or Deployment which uses custom behavior for virtual interfaces, PVC, Services associated per pod, and custom behaviors for default Kubernetes resources. The managed application pods 428 may accordingly have external (e.g., outside the Kubernetes cluster) connectivity, persistent IP addressing, virtual or floating IPs (VIP), default cluster IP Service per pod, high availability (HA) support, symmetric ingress and egress paths, and dynamic service updates.

CnApp resources may be made resilient by storing data in a resource metadata section, so during operator 418 and application restart, metadata (e.g., labels and annotations) can be fetched to recreate a desired state. The CnApp operator 418 may also include a reconciler 432 to watch custom and owned resources for changes, and bring them to a desired state from a current state. The reconciler 432 may include a finalizer associated with the CnApp resource 420 to perform a bundle cleanup before the resource is deleted. For example, in case of a crash or outage, when the system comes back up the finalizer may be executed to perform the cleanup. The finalizer cleanup may include checking what the associated resources for the application are, including the StatefulSet, Deployment, etc. resources, the Services, PVC, ConfigMap, Secrets, etc.

The first part of the example three-part solution for implementing a cnSBC, as described in regard to FIG. 3, included the CnApp operator 418 bringing up application pods 428 and creating a trigger event for Vnic creation through the generation of VnicSet resource 416. The second part included a VnicSet operator 414 configured to handle the trigger event, and create and inject the Vnics onto the pods 428.

The VnicSet operator 414 may create a VnicSet resource 416 and associated Vnic. and inject the Vnic into a pod 428 to provide a network interface for that pod, as described herein. The Vnic created by the VnicSet operator may be a part of or associated with a cloud provider (e.g., OpenStack). Accordingly, at initialization the VnicSet operator 414 may execute API protocols to authenticate with a cloud provider using credentials provided in the VnicSet operator 414 definition file. The authentication process may provide the VnicSet operator 414 with privileges used in creating and managing the Vnics onto host worker nodes 422-426. Once successfully authenticated, the operator 414 may reauthenticate upon a 401 response from the cloud provider. If an ongoing API call fails with an Unauthenticated error, the underlying framework may attempt to reauthenticate using the credentials provided at initialization time. If the reauthentication fails, the operator may retry authentication after reading the credentials again from the mounted secret, and may retry reading and reauthentication a selected number of times before declaring an API failure. Upon receiving any cloud API failures, the operator event or request may be re-queued and, after a fixed delay, the VnicSet operator 414 reconciler 432 may be invoked again. In this run, the operator 414 may identify itself as unauthenticated and attempt to trigger authentication. The request may be re-queued for a selected number of times, after which the CRD State may be updated to "Authenticated Failed". All new requests after this may trigger a re-authentication for a selected number of times before a failure is declared.

VnicSet operator 414 may be configured to put a hook into the Kubernetes control plane 402 to create, watch, and manage its custom resource, VnicSet resource 416, which may hold the details for one or more Vnics. The VnicSet resource 416 definition file may include a PodID entry to identify a particular target pod 428. The PodID of an application pod 428 may be a name or number, and may be manually entered or automatically generated. The definition file may also take inputs such as a number of Vnics to be created for the target pod 428, what are the Vnic IPs, and which application pod 428 a Vnic should be injected to (e.g., identified by pod name or pod ID number). Based on the pod 428 the Vnic should be injected into, the VnicSet operator 414 may identify a worker node 422-426 on which the target pod 428 is running.

The VnicSet operator 414 may create the number of desired Vnics on the worker node 422-426 where the target pod 428 is running, and these Vnics may have IPs that are reachable from outside the cluster without being managed by Kubernetes. A Vnic may be created with a predetermined fixed IP address, which may be provided as part of the CRD file for the VnicSet resource 416. As the CnApp operator 418 may generate the VnicSet resource CRD, the CnApp operator may obtain the IP address configuration information from a CnApp resource 420 definition file (e.g., from information provided by a user via user modifications 404). If a specific IP is not provided by or to the VnicSet operator 414, it may be dynamically allocated via DHCP (dynamic host configuration protocol).

Once a Vnic has been created on the node 422-426 where a target pod 428 is located, the VnicSet operator 414 may create a job on that same worker node 422-426. The job may inject one or more Vnics from the worker node 422-426 to a container 430 in the target pod 428. In the Kubernetes architecture, pods 428 may run in "silos" called namespaces, which may correspond to Linux control groups (Cgroups), that isolate groups of resources within a single cluster. "Injecting" a Vnic from a worker node 422 into a pod 428 may involve exposing the namespace of the host node 422 where the Vnic is created and moving the Vnic to the target container 430 namespace. The Vnic may be initially created onto the host node 422 where the target pod 428 is running, and the job executed on that node 422 takes the Vnic out of the host namespace and Cgroups, changes its reference, and moves it into the namespace for the specific application pod 428 or pod container 430. For example, Vnics may be injected into containers 430 within a pod 428, so that each container 430 may have its own Vnic not usable by other containers within the pod 428. By injecting the Vnics, an external interface into the pod may be created that has features such as a consistent or fixed IP address that can be known before creation of the pod and Vnic, high capacity, failover support to enable HA, a same ingress and egress path, and potentially lower latency than traffic managed by Kubernetes.

A VnicSet operator 414 may be configured to operate in all or selected namespaces. An environment variable may be available for the VnicSet operator 414 during initialization. The operator scope may be determined based on the value configured for this environment variable: For example, to operate in all namespaces, the "WATCH_NAMESPACE" environment variable may be omitted or left blank, where an empty value means the operator can run with cluster scope (e.g., all namespaces within the cluster). To operate within only specified namespaces, the "WATCH_NAMESPACE" variable may be defined with the namespace names, with multiple values separated by commas.

The process of creating, updating, and deleting resources via CnApp operator 418 and VnicSet operator 414 may be managed by the respective reconciler elements 432. Examples of reconcilers 432 are described in more detail in regard to FIG. 5.

Figure 5:
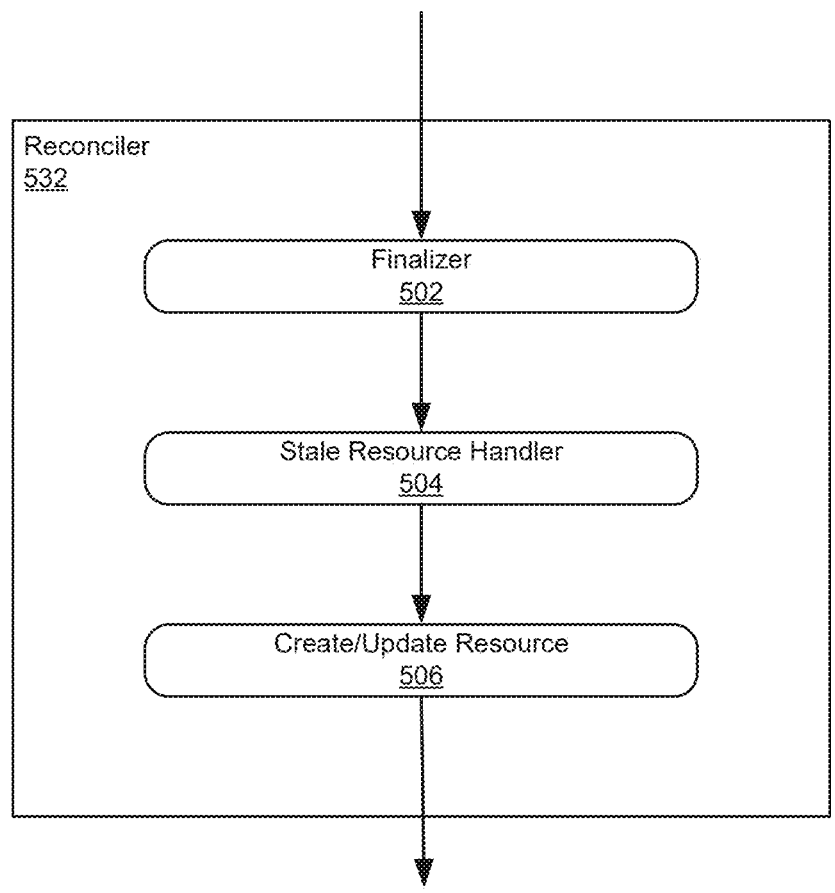
FIG. 5 is a diagram of a system configured to implement a virtual IP for a container pod, in accordance with certain embodiments of the present disclosure.

FIG. 5 depicts a diagram of a system 500 configured to implement a virtual IP for a container pod, in accordance with certain embodiments of the present disclosure. In particular, the system 500 may depict an example reconciler module 532, which may correspond to reconciler modules 432 of FIG. 4. The reconciler 532 may include a finalizer module 502, a stale resource handler module 504, and a create and update resource module 506. As described herein, a reconciler 532 may be a module or process included within a custom operator (e.g., in a Kubernetes architecture). The reconciler 532 may loop to determine a state of an associated custom resource, and make changes to the resource to bring it from a current state to a desired state.

The reconciler 532 logic may follow a sequence flow to determine what changes may be needed to bring a resource to the desired state. In the depicted example, the logic may proceed from the finalizer 502, to the stale resource handler 504, to the create and update resource module 506.

The finalizer 502 may be a routine or module which gets executed before a resource is deleted to perform cleanup handling. The finalizer 502 cleanup may include checking what the associated resources for an application are, determining the status of resources to determine when resources are safe to delete or detach, and deleting or detaching appropriate resources. When Kubernetes receives an indication that an application was or is to be deleted, it may make a deletion timestamp indicating a time that a resource is marked for deletion. The finalizer 502 for an operator may check the timestamp to determine whether to execute cleanup code or delete the resource.

The stale resource handler 504 may be a routine or module that determines if a resource associated with the application has become "stale", in which the resource has been terminated or is not found (e.g., no longer exists). If the resource is determined to be stale, the stale resource handler 504 may initiate deletion of any elements or resources associated with the stale resource. Accordingly, the stale resource handler 504 may perform a cleanup routine or delete elements even if they have not been marked for deletion, unlike the finalizer 502.

The create or update resource module 506 may be configured to check a current state of a resource, and compare it to a desired state (e.g., as designated in a CRD yaml file). If the current state does not match the desired state, the create or update resource module 506 may generate or modify the resource until it matches the desired state.

When an operator is initiated or restarted, it may invoke the reconciler 532 to scan the cluster or namespace in which it is running for all resources of its type, and checks if any of those resources need to be cleaned up, updated, or changed. The scan may include accessing the API server 410 in the control plane 402, which may provide information about all resources of a given type (e.g., VnicSet, CnApp, etc.). Based on the results of its scan, the operator may update its own metadata with information about the discovered resources (e.g., resource IDs, status information, etc.). The specifics of how the elements of reconciler 532 function or the processes they perform may depend on the operator with which they are associated (e.g., VnicSet operator 414 or CnApp operator 418).

For example, when the CnApp operator 418 or VnicSet operator 414 starts, boots up, or restarts, they may scan the cluster (e.g., by checking an etcd database) for all or specific namespaces as per their configurations. The respective operator may identify all existing resources of the matching type (e.g., CnApp for CnApp operator 418, or VnicSet for VnicSet operator 414). A CREATE event may be generated for the existing identified resources by the k8s control plane 402 to the corresponding operator, because the operator may be identifying the resources for the first time. Predicate functions may pass the create event, and the reconciler 532 of the respective operator may be invoked. The reconciler 532 of the respective operator may determine whether there is a finalizer pending on or associated with its identified resource, and if so, execute the finalizer.

For a CnApp operator 418, the reconciler 532 may identify a CnApp instance for an identified resource, read meta-data from the CnApp instance (e.g., owned StatefulSet, Pods, Service, PVC. Associated VnicSet, Vnics), and scan the CRD file and brings the resource to the desired state, and then update the meta-data or status accordingly. For a VnicSet operator 414, the reconciler 532 may determine whether a pod ID in the VnicSet resource is terminated or not found, and if so may invoke the stale resource handler 504 to delete the resource, and update the operator metadata and status accordingly. If the pod ID is valid, the reconciler 532 may check the VnicSet resource meta-data and verifies no Vnic injection is needed (e.g., a Vnic on the pod is desired and the current Vnic count is correct). The reconciler 532 may update the VnicSet operator metadata and status to reflect the resource information in the VnicSet operator, and repeat the process until all pods are verified. The VnicSet reconciler 532 may scan the VnicSet resource CRD yaml file to bring VnicSet resource current state to the desired state.

The starting and restarting process described above may be performed even if all operators and all pods are running on a same worker node 422, and the node crashes (or some other combination between resources and operators on crashing and functioning nodes). The operator pods may be scheduled on another available node 424, and all resources may be reconciled to bring to a desired state. Recovering even when all components crashed may be possible because the metadata may be stored on an etcd component (not shown) of the control plane 402, which may be a consistent and highly-available key value store for cluster data. As used herein, "crashing" may refer to a node or pod unresponsiveness, outage, loss, failure, or otherwise becoming unavailable.

Reconcilers 532 may be set to run concurrently for controllers so that multiple worker nodes 422-426 can handle the CRD operations (e.g., create, update, and delete). The number of concurrent reconcilers 532 can be changed by setting a value of a MaxConcurrentReconciles attribute under the controller. Options setting.

More specific examples of operations implemented by the custom operators and their reconcilers 532 are described in regard to the following figures. In particular, FIGS. 6-9 depict overviews of how CnApp operator 418 and VnicSet operator 414 manage application creation, deletion, pod crashes and restarts, and updates. FIGS. 10-15 depict more detailed process flows for the reconciler 532 components of CnApp operator 418 and VnicSet operator 414. An application creation event is described in regard to FIG. 6. Once an application pod 428 cluster is generated by CnApp operator 418, it may trigger the creation and handling of Vnics by VnicSet operator 414 to provide a secondary network interface not directly managed by Kubernetes.

Figure 6:
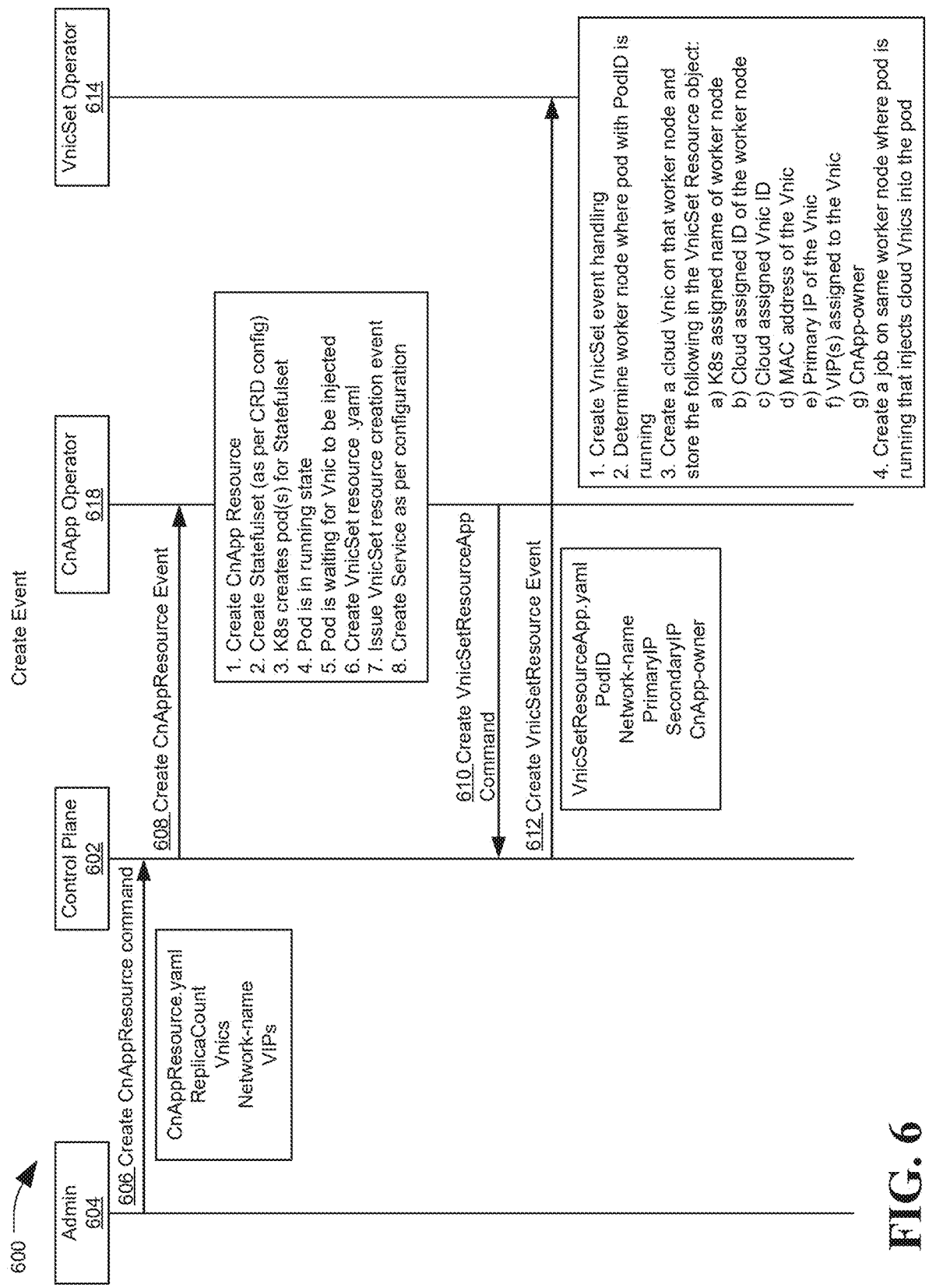
FIG. 6 is a process flow diagram of a system configured to implement a virtual IP for a container pod, in accordance with certain embodiments of the present disclosure.

FIG. 6 is a process flow diagram of a system 600 configured to implement a virtual IP for a container pod, in accordance with certain embodiments of the present disclosure. In particular, FIG. 6 depicts a sequence of operations and data transfers between an admin module 604, a control plane 602, a CnApp operator 618, and a VnicSet operator 614, which may correspond to control plane 402, CnApp operator 418, and VnicSet operator 414 of FIG. 4. Although not shown in FIG. 6 for the sake of clarity, information may also be exchanged between elements of system 600 and other elements of FIG. 4. The operations of system 600 may be an example method to create a CnApp resource, and in turn create a VnicSet resource to create and inject a Vnic into a pod in a Kubernetes environment. Operations performed by CnApp operator 618 and VnicSet operator 614 may be executed by respective reconciler modules (e.g., by a create and update resource module for each custom operator).

Admin module 604 may include a user interface, such as a command line interface (CLI), an API interface, or other mechanism by which a containerized software system may receive initial commands to implement a cnSBC or create a CnApp application or resource. The admin module 604 may issue a 'create CnAppResource' command 606 or instruction to the control plane 602. The create CnAppResource command 606 may include a custom resource definition (CRD) yaml file for the CnApp resource, which may define features of a CnApp resource to be created as well as specifications for related VnicSet resources to be created, such as a ReplicaCount field (with a replica count value indicating a number of application pods to initialize), Vnics details, one or more network names, and virtual IP (VIP) details. Based on the create CnAppResource command 606, the control plane 602 may trigger or provide a 'create CnAppResource event' notification 608 to the CnApp operator 618.

In response to the create CnAppResource event notification 608, the CnApp operator 618 may execute a number of operations. It may create a CnApp resource to manage. Per the CRD configuration file, the CnApp operator 618 may create a pod resource for the CnApp resource, such as a StatefulSet (or Deployment, or other resource) while Kubernetes may create the pods for the StatefulSet. When the CnApp operator 618 determines that the pod(s) is in a running state and waiting for a Vnic to be injected, the CnApp operator 618 may initiate the creation of one or more VnicSet resources (e.g., one VnicSet resource for each pod, and each VnicSet resource may have one or more Vnics for the associated pod). To do this, the CnApp operator 618 may create a CRD for each VnicSet resource (e.g., VnicSet resource yaml definition file, such as VnicSetResourceApp.yaml). The CnApp operator 618 may apply the CRDs programmatically to the control plane 602 to issue 'create VnicSetResourceApp' commands 610. The Kubernetes-assigned ID of those VnicSet resources may be stored in the pod metadata. The CnApp operator 618 may also configure or manage Service (e.g., Cluster IP Service), PVC. ConfigMap, Secrets, or other resources for the application pod(s), as per the CnApp configuration or definition file. The CnApp operator 618 may mark itself as the owner of resources created by the CnApp operator 618 for the purposes of resource cleanup.

Receiving the "create VnicSetResourceApp" command 610 at the control plane 602 may trigger a "create VnicSetResource event" notification 612, which may be sent to or noticed by the VnicSet operator 614. The notification 612 may include data such as the VnicSetResourceApp.yaml CRD file created by the CnApp operator 618, which may include PodID, Network-name, primary IP (e.g., a fixed IP address for the Vnic), one or more secondary IP (e.g., one or more virtual IPs to assign to the Vnic), and CnApp-owner data. The secondary IPs can be included in the CRD or left blank, in which case the VIPs may be allocated by DHCP dynamically. The secondary or VIPs assigned to a Vnic may be routed to the primary or fixed IP.

In response to the create VnicSetResource event 612 notification (and associated CRD), the VnicSet operator 614 may perform a number of operations. It may execute a create VnicSet event handling operation. The operation may include determining a worker node where the pod having the PodID from the 'create VnicSetResource event' notification 612 is running. The VnicSetOperator 614 may create a cloud Vnic on the identified worker node, and store the following data in the VnicSet resource object: a) K8s assigned name of worker node; b) Cloud assigned ID of the worker node; c) Cloud assigned Vnic ID; d) Cloud assigned MAC (media access control) address of the Vnic; e) Cloud assigned primary IP of the Vnic; f) VIP(s) assigned to the Vnic; and g) CnApp-owner. Finally, the VnicSet operator 614 may create a job on the identified worker node that injects the cloud Vnic into the target pod. The VnicSet operator 614 may mark itself as the owner of resources created by the VnicSet operator 614 for the purposes of resource cleanup.

Figure 7:
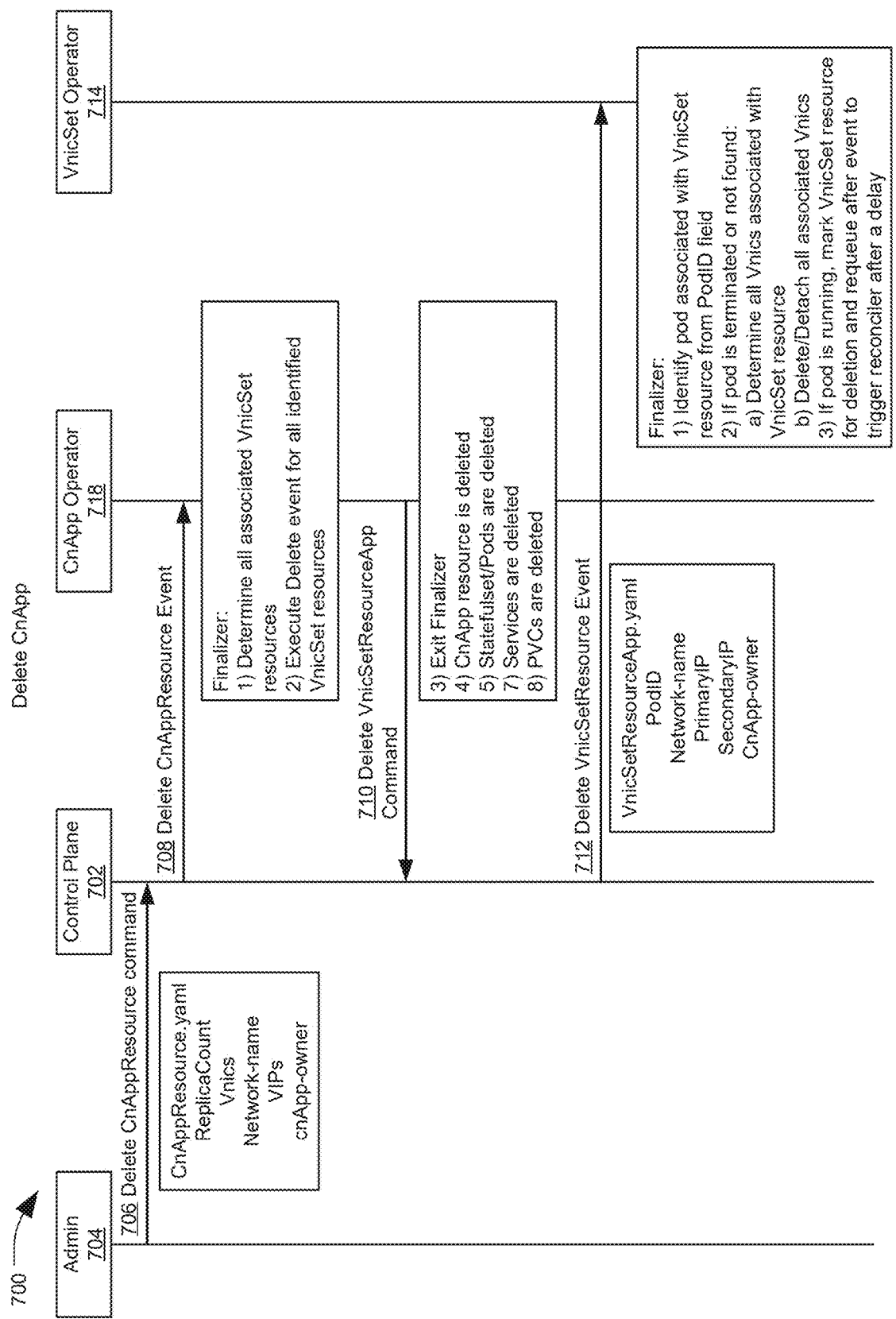
FIG. 7 is a process flow diagram of a system configured to implement a virtual IP for a container pod, in accordance with certain embodiments of the present disclosure.

In some examples, a VnicSet operator 614 may be deployed without a corresponding CnApp operator 618. For example, an administrator may manually set up a StatefulSet and associated pods and resources, and may submit a VnicSetResourceApp.yaml CRD file to the Kubernetes control plane 602 to trigger the creation and insertion of Vnics onto the designated pods. The CnApp operator 618 provides additional automation and resource handling functionality, so that a containerized software application may have its resources handled (e.g., scaled up or down) and the associated Vnics created and managed dynamically. FIG. 7 depicts an example process for handling a delete event involving a CnApp operator 718 and a VnicSet operator 714.

FIG. 7 is a process flow diagram of a system 700 configured to implement a virtual IP for a container pod, in accordance with certain embodiments of the present disclosure. In particular, FIG. 7 depicts a sequence of operations and data transfers between an admin module 704, a control plane 702, a CnApp operator 718, and a VnicSet operator 714, which may correspond to control plane 402, CnApp operator 418, and VnicSet operator 414 of FIG. 4. Although not shown in FIG. 7 for the sake of clarity, information may also be exchanged between elements of system 700 and other elements of FIG. 4. The operations of system 700 may be an example Delete CnApp method including a CnApp operator 718 and a VnicSet operator 714, to delete or free resources in a Kubernetes environment. Operations performed by CnApp operator 718 and VnicSet operator 714 may be executed by respective reconciler modules (e.g., by a finalizer module for each custom operator).

The admin module 704 may issue a 'delete CnAppResource' command 706 or instruction to the control plane 702, for example in response to a customer or user instruction. The delete CnAppResource command 706 may identify a resource name to delete, or may even identify one or more resources to delete using a custom resource definition (CRD) yaml file for the CnApp resource, where the CRD may include a ReplicaCount field for a number of pods. Vnics details, a network name, virtual IP (VIP) details, and a CnApp-owner identifier. Based on the delete CnAppResource command 706, the control plane 702 may provide a 'delete CnAppResource event' notification 708 to the CnApp operator 718.

In response to the delete CnAppResource event notification 708, the CnApp operator 718 may trigger a finalizer module of the reconciler 432 element of the CnApp operator 718. For the CnApp operator 718, the finalizer may determine VnicSet resources associated with the CnApp resource to be deleted, such as by identifying associated VnicSet resources for pods associated with the CnApp resource. For example, the CnApp resource metadata may have a list of all mappings of PodID and VnicSet resource IDs. The finalizer may trigger one or more delete events for the VnicSet operator 714 on all the identified VnicSet resources. The events may be triggered by sending delete VnicSetResourceApp commands 710 from the CnApp operator 718 to the control plane 702. The CnApp operator 718 may then exit the finalizer, and proceed to delete resources associated with or marked as owned by the CnApp operator 718, including the CnApp resource 420, any StatefulSet and pods, Services, and PVCs, ConfigMaps, Secrets, etc. In some examples, the CnApp operator 718 may delete a CnApp resource element itself, which may trigger Kubernetes processes to remove standard K8s elements such as pods, Services, etc.

When the control plane 702 receives the delete VnicSetResource App command 710, it may trigger a delete VnicSetResource event 712, which may be sent to or noticed by the VnicSet operator 714. The notification 712 may include a VnicSet resource name or identifier to delete, and in some examples may include data such as a VnicSetResourceApp.yaml file having a PodID, Network-name, primary IP, secondary IP, and CnApp-owner data.

In response to the delete VnicSetResource event notification 712, the VnicSet operator 714 may perform a number of operations. In an example, the VnicSet operator 714 may invoke the finalizer of its reconciler module 432, which may identify a pod associated with the VnicSet resource from the PodID field. The finalizer may evaluate a status of the identified pod to determine how to handle Vnics associated with the pod. If the pod is terminated (e.g., not running) or not found, then the finalizer may fetch all associated Vnics (e.g., by VnicIds) from the VnicSet resource and delete or detach them one by one. However, deletion of a pod may need to be deferred if there is a pending operation on the pod or worker node, or any temporary errors that may cause re-attempts. If the pod is still running (e.g., busy with an operation), then the delete or detach operation may be deferred by marking the pod for deletion in the VnicSet resource, which may be checked in a next reconciliation cycle after a delay by executing a requeue after the event 712. When a reconciler 432 is invoked, it may invoke a stale resource handler element API to reconcile the state of any existing resources marked for deletion, which can delete or detach a Vnic when the associated pod is determined to be terminated or not found.

Figure 8:
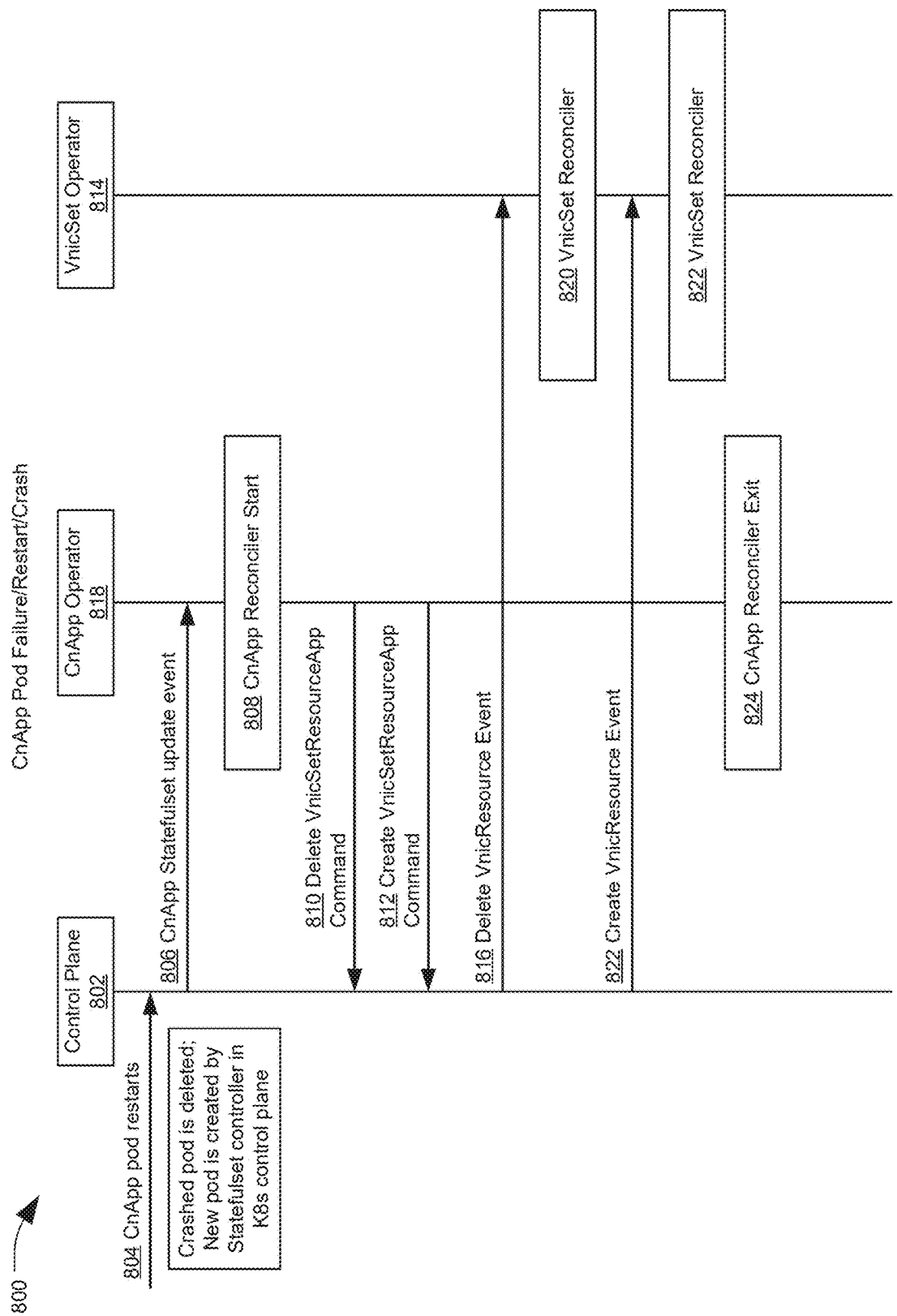
FIG. 8 is a process flow diagram of a system configured to implement a virtual IP for a container pod, in accordance with certain embodiments of the present disclosure.

Turning now to FIG. 8, a process flow diagram of a system 800 configured to implement a virtual IP for a container pod, in accordance with certain embodiments of the present disclosure. In particular, FIG. 8 depicts a sequence of operations and data transfers between a control plane 802, a CnApp operator 818, and a VnicSet operator 814, which may correspond to control plane 402, CnApp operator 418, and VnicSet operator 414 of FIG. 4. Although not shown in FIG. 8 for the sake of clarity, information may also be exchanged between elements of system 800 and other elements of FIG. 4. The operations of system 800 may be an example process for handling a pod failure, crash, or restart via a CnApp operator 818 and a VnicSet operator 814 in a Kubernetes environment. Operations performed by CnApp operator 818 and VnicSet operator 814 may be executed by respective reconciler modules (e.g., by a stale resource module and a create or update resource module for each custom operator).

The process may start when a crashed pod restarts 804 via control plane 802. When a pod from a StatefulSet crashes, restarting the pod in Kubernetes may include deleting the crashed pod, and creating a new pod via a StatefulSet controller in the K8s control plane 802. When a CnApp pod is the one that restarts or crashes, the resources for that pod (e.g., ConfigMap, Secrets, PVCs, VnicSet resource) may be cleaned up using the CnApp operator 818. Accordingly, the control plane 802 may cause one or more CnApp StatefulSet update event 806 for the StatefulSet owned by CnApp. The CnApp operator 818 may monitor for trigger events to CnApp resources and StatefulSet resources owned by the CnApp. The update event 806 may notify the CnApp operator 818 that a CnApp pod of the StatefulSet has crashed and a new pod has been created.

In response to the event 806, the CnApp operator 818 may trigger its reconciler module to start, at 808. The CnApp reconciler may first check for reconciliation of stale resources, leading to deletion of Vnics associated with the crashed or deleted pod, via a delete VnicSetResourceApp command 810 being issued from CnApp operator 818 to control plane 802. The create and update module of the reconciler may then determine there is a new pod in a running state which needs a Vnic, leading to the creation of a VnicSet resource, via a create VnicSetResourceApp command 812 being issued from CnApp operator 818 to control plane 802.

In response to the delete VnicSetResourceApp command 810, the control plane 802 may trigger a delete VnicResource event 816. The VnicSet operator 814 may note the event 816, and trigger its own reconciler to delete any marked stale VnicSet resource ID at 820.

The create VnicSetResourceApp command 812 may cause the control plane 802 to trigger a create VnicResource event 822, which may cause the VnicSet operator 814 reconciler to create and inject a Vnic onto the newly created pod, at 822. For example, the VnicSet operator 814 create and update reconciler module may determine the worker node for the new pod, and create a cloud Vnic on that worker node, as well as store details to the VnicSet resource object as described for Vnic creation in regard to FIG. 6. The VnicSet operator 814 create and update reconciler module may then create a job on the worker node to inject the newly-created Vnic into the new pod.

Once the crashed or failed pod resources have been deleted and the newly-created pod has been updated with a Vnic, the CnApp operator 818 reconciler may exit, at 824. Next, a CnApp update event is described in regard to FIG. 9.

Figure 9:
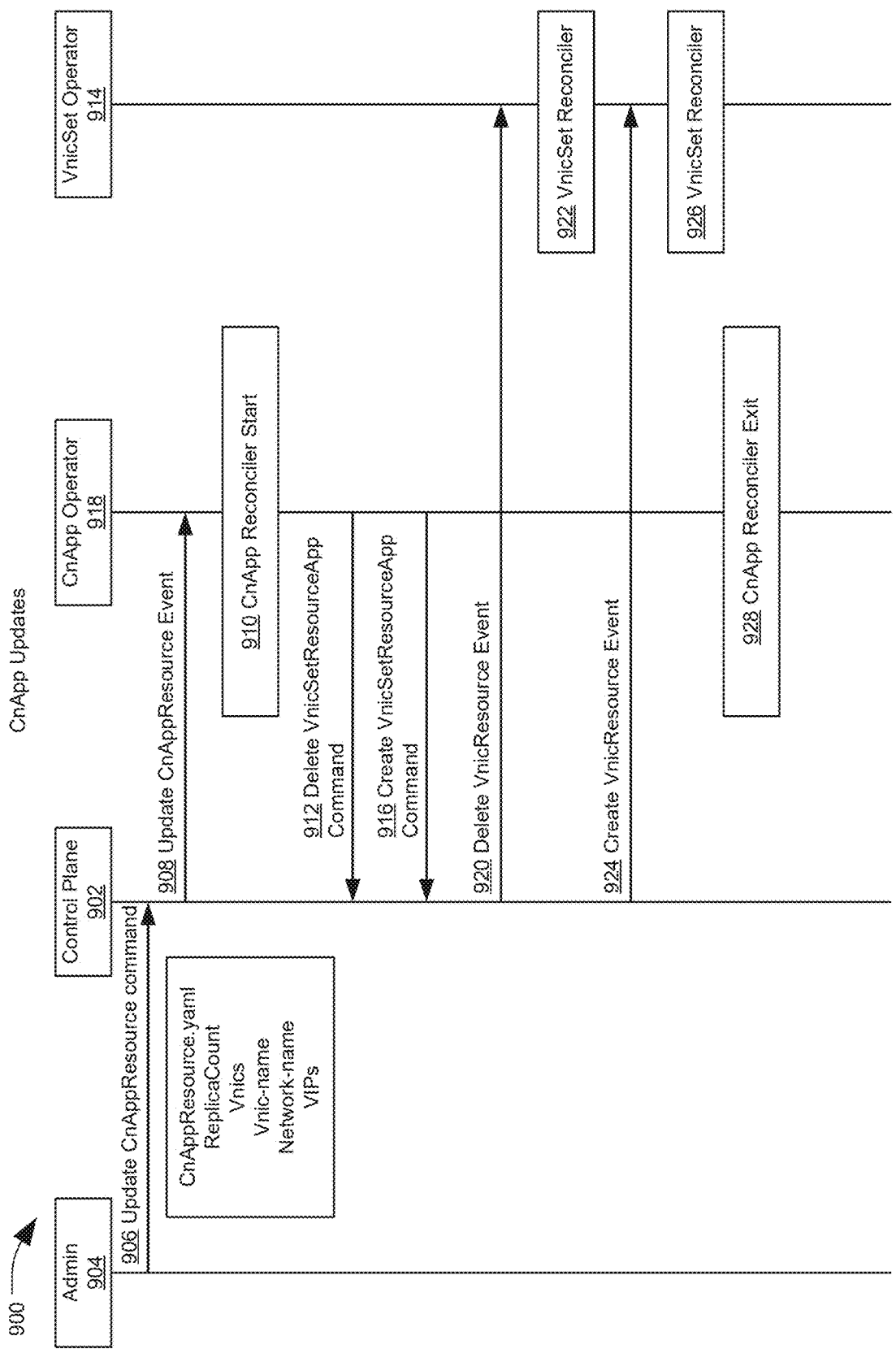
FIG. 9 is a process flow diagram of a system configured to implement a virtual IP for a container pod, in accordance with certain embodiments of the present disclosure.

FIG. 9 is a process flow diagram of a system 900 configured to implement a virtual IP for a container pod, in accordance with certain embodiments of the present disclosure. In particular, FIG. 9 depicts a sequence of operations and data transfers between an admin module 904, a control plane 902, a CnApp operator 918, and a VnicSet operator 914, which may correspond to control plane 402, CnApp operator 418, and VnicSet operator 414 of FIG. 4. Although not shown in FIG. 9 for the sake of clarity, information may also be exchanged between elements of system 900 and other elements of FIG. 4. The operations of system 900 may be an example process for handling a CnApp update event via a CnApp operator 918 and a VnicSet operator 914 in a Kubernetes environment. Operations performed by CnApp operator 918 and VnicSet operator 914 may be executed by respective reconciler modules (e.g., by a stale resource module and a create or update resource module for each custom operator). Example scenarios for updates to application pods may include a change to image names, replica size (e.g., number of pods), or addition, deletion or update of VIPs for the Vnics injected into pods.

The admin module 904 may issue an 'update CnAppResource' command 906 or instruction to the control plane 902, for example in response to a customer or user instruction or a Kubectl apply operation. The update CnAppResource command 906 may include a CnAppResource custom resource definition (CRD) yaml file for the CnApp resource, which may include a ReplicaCount field for a number of pods, Vnics details and Vnic-name, a network name, and virtual IP (VIP) details. Some of the attribute or parameter values for the CnAppResource CRD file may be changed from the CRD submitted to initially create the resource (e.g., in FIG. 6). Based on the update CnAppResource command 906, the CnApp operator 918 may detect an 'update CnAppResource event' notification 908 from the control plane 902.

In response to the update CnAppResource event notification 908, the CnApp operator 918 may trigger its reconciler 432 element. Depending on the type of updates, resources may be deleted or removed (e.g., by the stale resource handler module of the reconciler 432), created or updated (e.g., by the create or update resource module), or both (e.g., an outdated version of a resource may be deleted and an updated version may be created to replace it). In the depicted example of FIG. 9, the CnApp operator 918 may send a delete VnicSetResourceApp command 912 to the control plane 902 (e.g., from the stale resource handler module), and send a create VnicSetResourceApp command 916 to the control plane 902 (e.g., from the create/update module).

When the control plane 902 receives the delete VnicSetResourceApp command 912, it may trigger a delete VnicResource event 920, which may be sent to or noticed by the VnicSet operator 914. In response to the delete VnicResource event notification 920, the VnicSet operator 914 may invoke its reconciler module 432 at 922, which may handle deletion of a specified VnicSet resource (e.g., as described in regard to FIG. 7).

When the control plane 902 receives the create VnicSetResourceApp command 916, it may trigger a create VnicResource event 924, which may be sent to or noticed by the VnicSet operator 914. In response to the create VnicResource event notification 924, the VnicSet operator 914 may invoke its reconciler module 432 at 926, which may handle creation of a specified VnicSet resource (e.g., as described in regard to FIG. 6).

Figure 10:
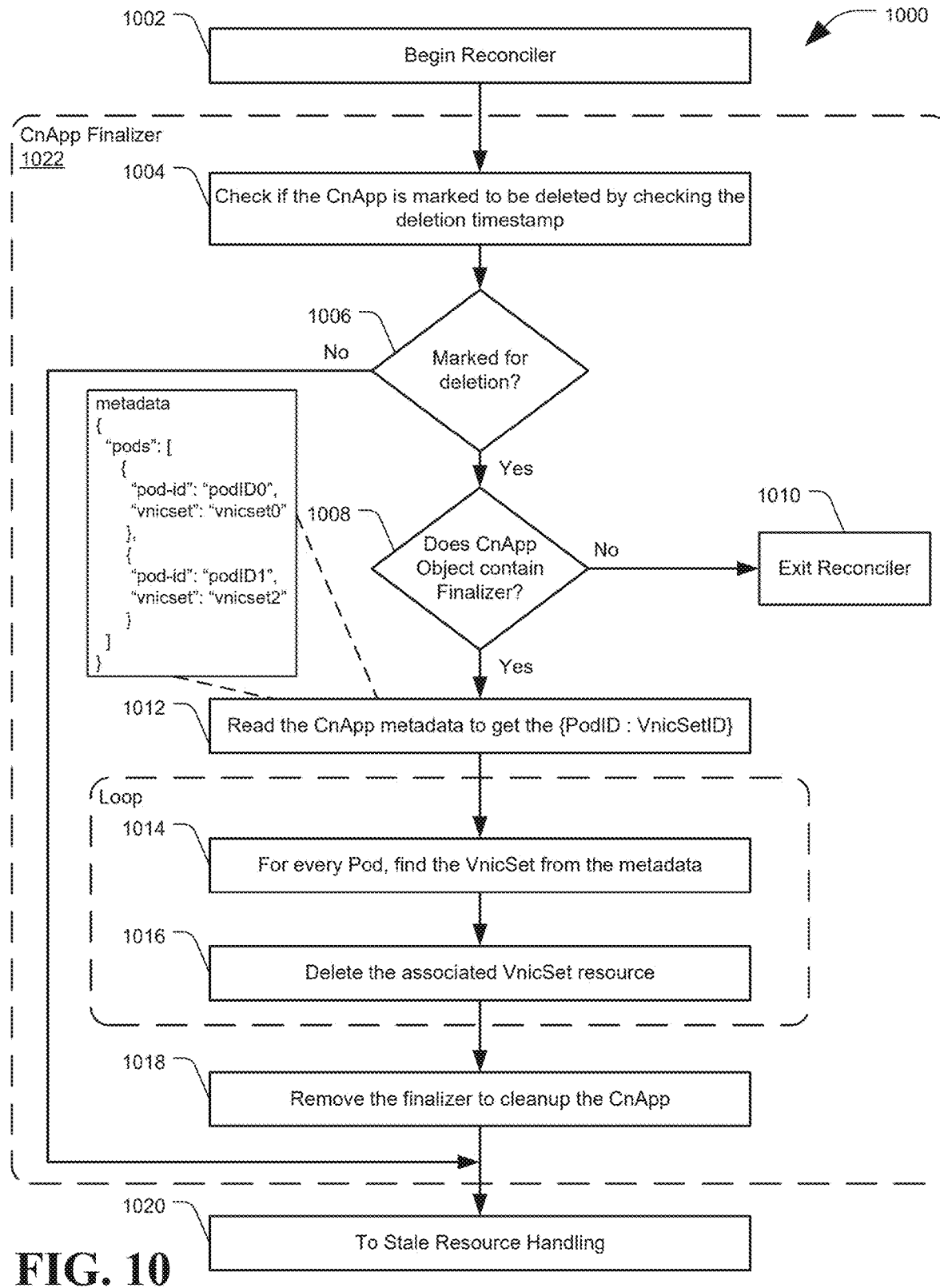
FIG. 10 is a flowchart of an example method for implementing a virtual IP for a container pod, in accordance with certain embodiments of the present disclosure.
Figure 11:
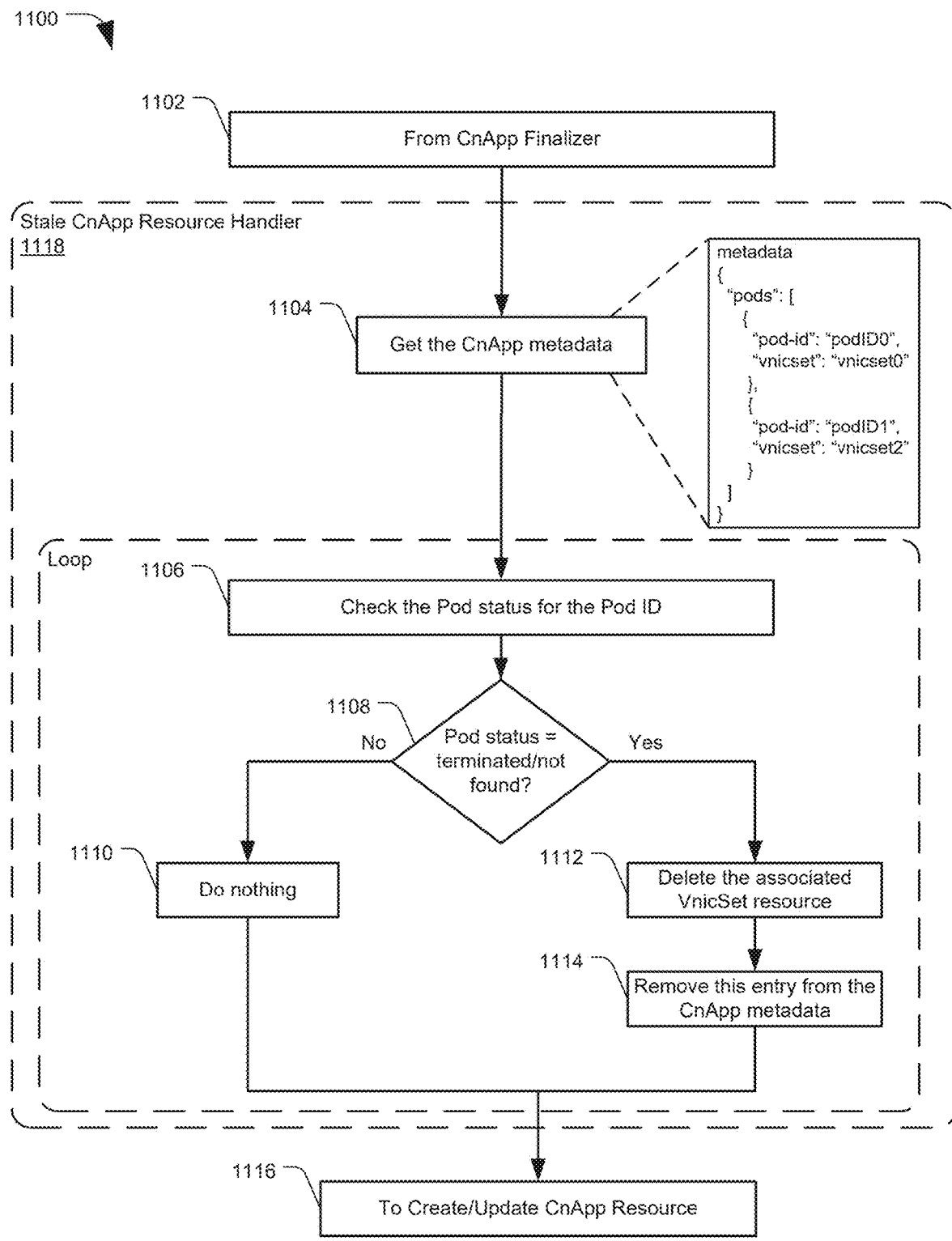
FIG. 11 is a flowchart of an example method for implementing a virtual IP for a container pod, in accordance with certain embodiments of the present disclosure.
Figure 12:
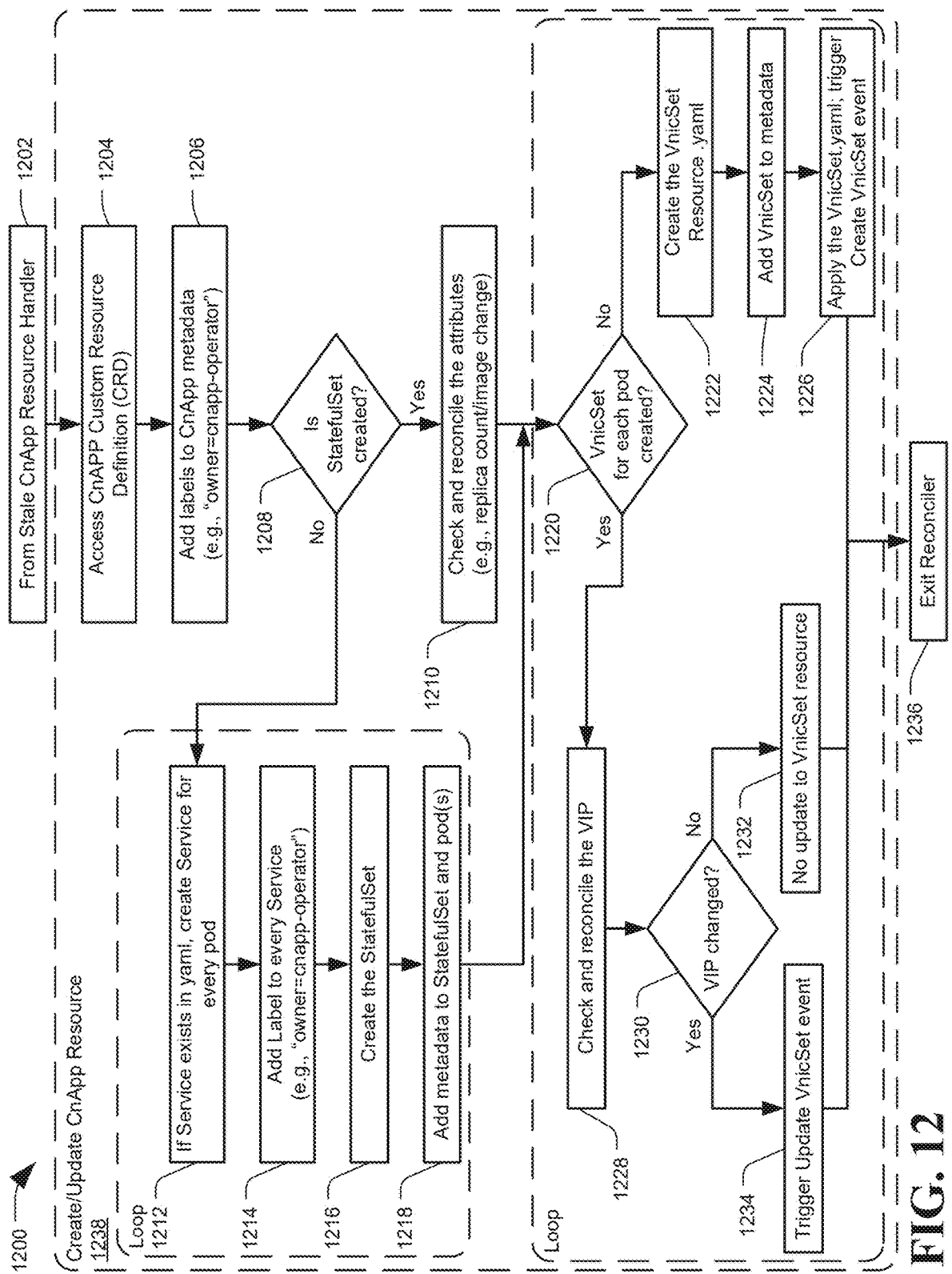
FIG. 12 is a flowchart of an example method for implementing a virtual IP for a container pod, in accordance with certain embodiments of the present disclosure.

In some examples, such as depending on the nature of the update command 906, CnApp and VnicSet resources may be updated without deletion or creation of resources (e.g., via the create or update resource module). FIGS. 10-15 depict more detailed process flows for the reconciler 532 components of CnApp operator 418 and VnicSet operator 414, with FIGS. 10-12 depicting processes for the finalizer 502, stale resource handler 504, and create or update resource module 506 of reconciler 532 for a CnApp operator 418.

FIG. 10 is a flowchart 1000 of an example method for implementing a virtual IP for a container pod, in accordance with certain embodiments of the present disclosure. In particular, method 1000 may depict an example process flow for a finalizer component 502 of a reconciler module 432 of a CnApp operator 418. The method may be implemented by the CnApp operator 418 of FIG. 4, alone or in conjunction with other elements of system 400.

The method may include beginning the reconciler module or process, at 1002. As described herein, the reconciler for an operator may be a process loop used to monitor resources associated with the operator and bring them from a current state to a desired state. The status of a resource may change and need to be returned to a desired state, or the desired state may be changed (e.g., through a user input) so that resources should be changed from the current state to the updated desired state. The reconciler process may include a finalizer element (process flow 1022), a stale resource handler element, and a create or update resource element. The elements may each perform a series of status checks and potential changes to a resource, and may be performed in a selected order to remove, add, or adjust resources as appropriate. In the example embodiment of FIGS. 10-12, the order for the reconciler process may begin with the finalizer (FIG. 10), then proceed to the stale resource handler (FIG. 11), and then proceed to the create or update resource handler (FIG. 12) before exiting the reconciler or starting the loop over again.

After starting the reconciler at 1002 and proceeding to the CnApp finalizer process flow 1022, the method may include checking if the CnApp application or instance is marked to be deleted, at 1004. The finalizer 1022 may check if the CnApp is marked for deletion by determining whether Kubernetes has set a deletion timestamp for the CnApp. Based on the existence of the deletion timestamp, the method may include determining whether the CnApp is marked for deletion, at 1006. If no timestamp is set, the CnApp may not be marked for deletion, and the process may exit the finalizer 1022 and proceed to the stale resource handling module, at 1020.

If the deletion timestamp has been set and the CnApp resource is marked for deletion, the method may include determining whether the CnApp resource object contains a finalizer, at 1008. For example, when a resource is created, a finalizer may be associated with the resource by adding a link or URL (uniform resource locator) for a finalizer API call in the resource data. If there is no finalizer for the resource, it may indicate that the resource is not a custom CnApp resource and can be handled by other Kubernetes processes. Accordingly, when there is no finalizer for the resource, the method may include exiting the CnApp reconciler for the resource to be handled by other K8s systems, at 1010. However, if the CnApp resource does contain a finalizer, the method may include reading the CnApp resource metadata to obtain information such as related Pod ID and VnicSet IDs, at 1012.

Based on the metadata, the method may then include performing a loop, where for every identified pod, the finalizer finds or determines the VnicSet resource associated with it, at 1014. For example, the CnApp resource metadata may provide information that indicates which pods have had Vnics injected or associated with them, and the specific identifiers for each. The loop may then include deleting the determined associated VnicSet resource for each pod, at 1016. Deleting the VnicSet resource may include the CnApp operator sending or providing an indicator to the Kubernetes control plane for the deletion of the VnicSet resource (e.g., which may cause the control plane to set a deletion timestamp for the specified VnicSet resource). Sending the deletion indicator to the control plane may trigger an event that causes the VnicSet operator to delete the specified VnicSet resource.

Once the loop has completed for each pod, the method may include removing the finalizer to cleanup the CnApp resource, at 1018. With no finalizer hook, the Kubernetes control plane may clean up standard K8s resources. The cleanup operation may include deleting StatefulSet or pods, Services, PVCs, ConfigMap, Secret, and other resources associated with the CnApp resource. At this point, the method may then exit the finalizer 1022 and proceed to the stale resource handling module, at 1020. The operation of the stale resource handler is discussed in regard to the example embodiment of FIG. 11.

FIG. 11 is a flowchart 1100 of an example method for implementing a virtual IP for a container pod, in accordance with certain embodiments of the present disclosure. In particular, method 1100 may depict an example process flow for a stale resource handler component 504 of a reconciler module 432 of a CnApp operator 418. The method may be implemented by the CnApp operator 418 of FIG. 4, alone or in conjunction with other elements of system 400.

The process flow of the method may begin where the process flow of the CnApp finalizer ended, at 1102. At this point the stale CnApp resource handler process flow 1118 may begin. The method may include reading or obtaining the CnApp resource metadata, at 1104. The metadata may include information such as a list of pods and any associated Vnics (VnicSet), and IDs for each.

Based on the metadata, the method may then include performing a loop, where for every identified pod ID, the stale resource handler 1118 checks the pod status. A determination may be made whether the pod status is terminated or not found, at 1108. If not, the pod may be running normally, and the method may include doing nothing, at 1110. However, if the pod status is terminated or not found, the method may include deleting the associated VnicSet resource, at 1112, and then removing the pod entry from the CnApp metadata, at 1114. As with the finalizer, deleting the VnicSet resource may include the CnApp operator sending or providing an indicator to the Kubernetes control plane for the deletion of the VnicSet resource (e.g., causing the control plane to set a deletion timestamp for the specified VnicSet resource), which may trigger an event that causes the VnicSet operator to delete the specified VnicSet resource. Once the loop completes for all identified pods, the method may exit the stale CnApp resource handler 1118 and continue to the create or update CnApp resource module, at 1116. The operation of the create or update CnApp resource module is discussed in regard to the example embodiment of FIG. 12.

FIG. 12 is a flowchart 1200 of an example method for implementing a virtual IP for a container pod, in accordance with certain embodiments of the present disclosure. In particular, method 1200 may depict an example process flow for a create or update CnApp resource handler component 506 of a reconciler module 432 of a CnApp operator 418. The method may be implemented by the CnApp operator 418 of FIG. 4, alone or in conjunction with other elements of system 400.

The process flow of the method may begin where the process flow of the stale CnApp resource handler ended, at 1202. At this point the create or update CnApp resource process flow 1238 may begin. The method may include accessing a CnApp resource custom resource definition (CRD) file, at 1204, and may include adding a finalizer (e.g., a link to the finalizer process) to the CnApp resource if it does not exist. At 1206, the method may include adding labels to the CnApp metadata if it does not exist (e.g., adding a CnApp label of "owner=cnapp-operator"). For example, an owner label may not be a mandatory component in the CRD provided by a user, but may be added to CnApp resources for resource cleanup and management.

At 1208, a determination may be made whether a StatefulSet (or appropriate number of pods, ReplicaSet, etc.) has already been created. If so, the method may include checking and reconciling the attributes for the StatefulSet (e.g., replica count, or image change).

However, if the StatefulSet has not yet been created, the method may include beginning a loop for creating the appropriate StatefulSet(s), pod(s), and associated resources. The loop may include creating a Service for every pod, if Service exists in the CRD yaml file, at 1212. At 1214, the method may include adding a label to every Service (e.g., a Service label of "owner=cnapp-operator"). The method may include creating the StatefulSet and associated pods, at 1216, and then adding metadata to the StatefulSet and pod(s), at 1218. For example, the metadata may a StatefulSet label of "owner=cnapp-operator", and a pod label of "owner=cnapp-operator", "vnics_needed=<number_of_vnics>", and "svc_label=<svc_name>". At this point the loop may end.

Once the StatefulSet(s) have been created or reconciled, the method may enter another loop for each pod, starting with a determination of whether a VnicSet resource for each pod has been created, at 1220. If not, the method may include creating a VnicSet resource yaml file, at 1222, and adding the VnicSet to the CnApp metadata (e.g., by associating a VnicSet ID with each Pod ID). The method may then include applying the VnicSet resource yaml, which may trigger a create VnicSet event, at 1226. The create VnicSet event may include the CnApp operator sending or providing an indicator to the Kubernetes control plane for the creation of the VnicSet resource, which may trigger an event that causes the VnicSet operator to create and inject the specified VnicSet resource. The VnicSet operator may also associate a VIP with the injected Vnics.

Figure 13:
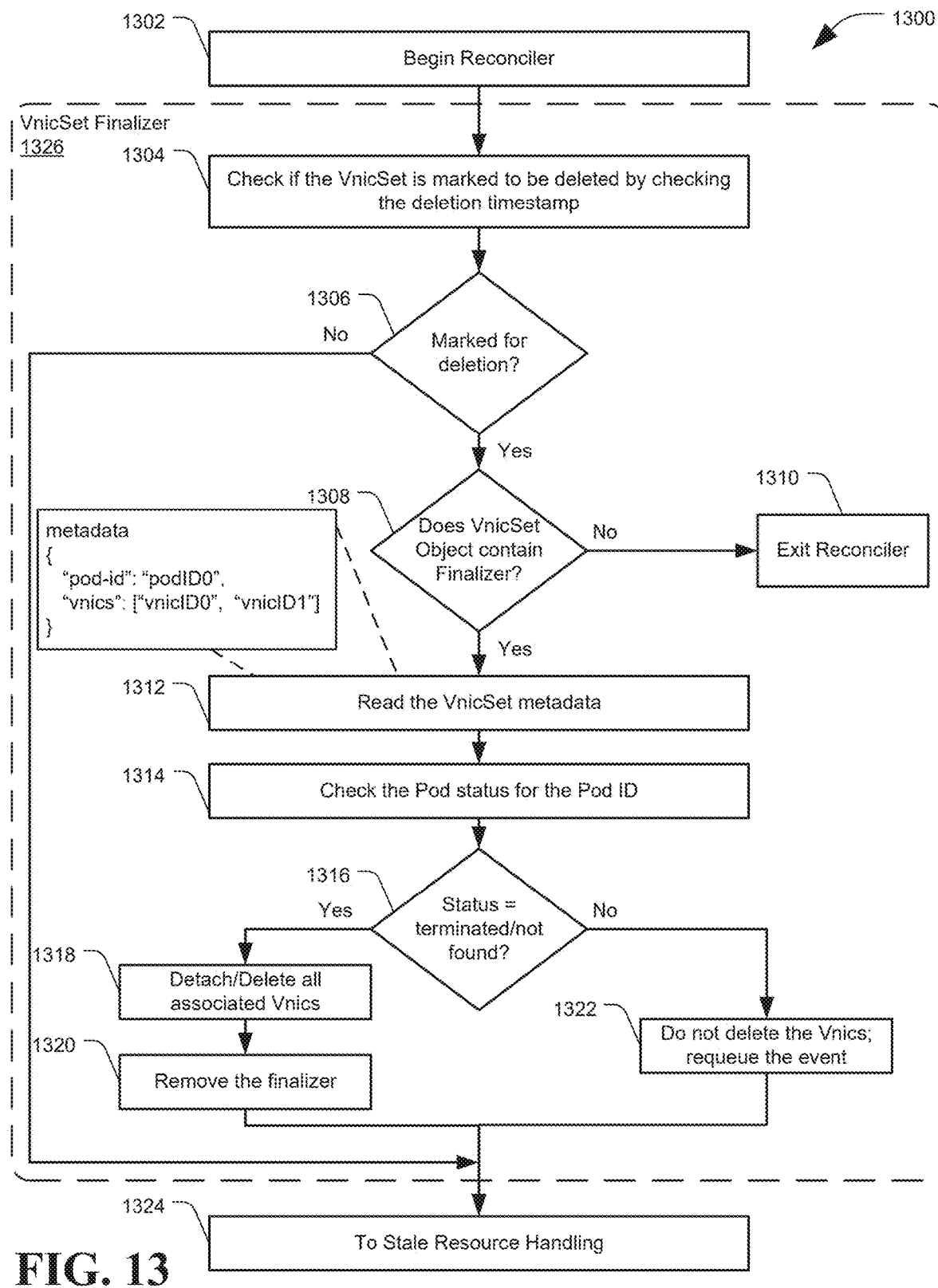
FIG. 13 is a flowchart of an example method for implementing a virtual IP for a container pod, in accordance with certain embodiments of the present disclosure.
Figure 14:
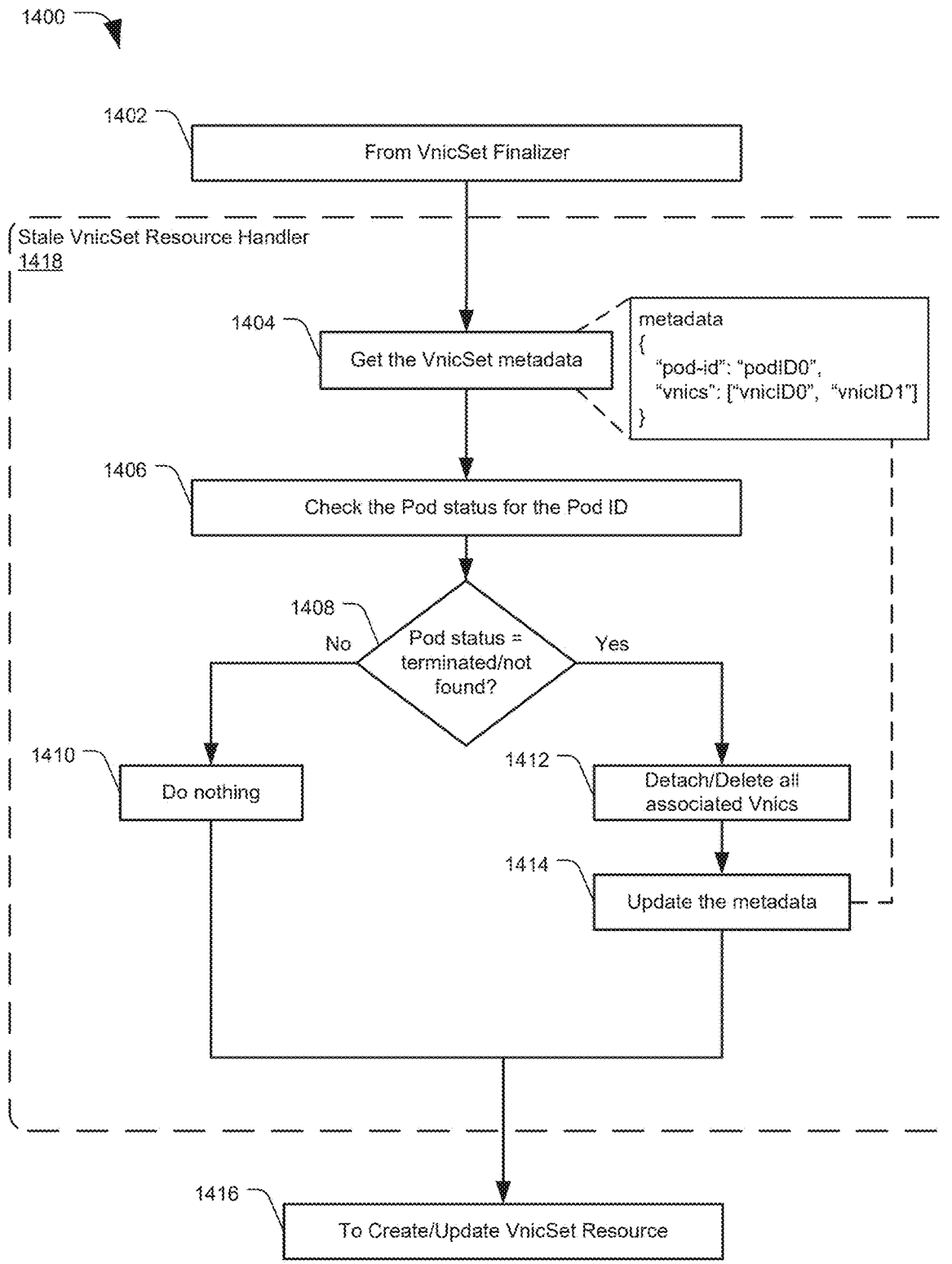
FIG. 14 is a flowchart of an example method for implementing a virtual IP for a container pod, in accordance with certain embodiments of the present disclosure.
Figure 15:
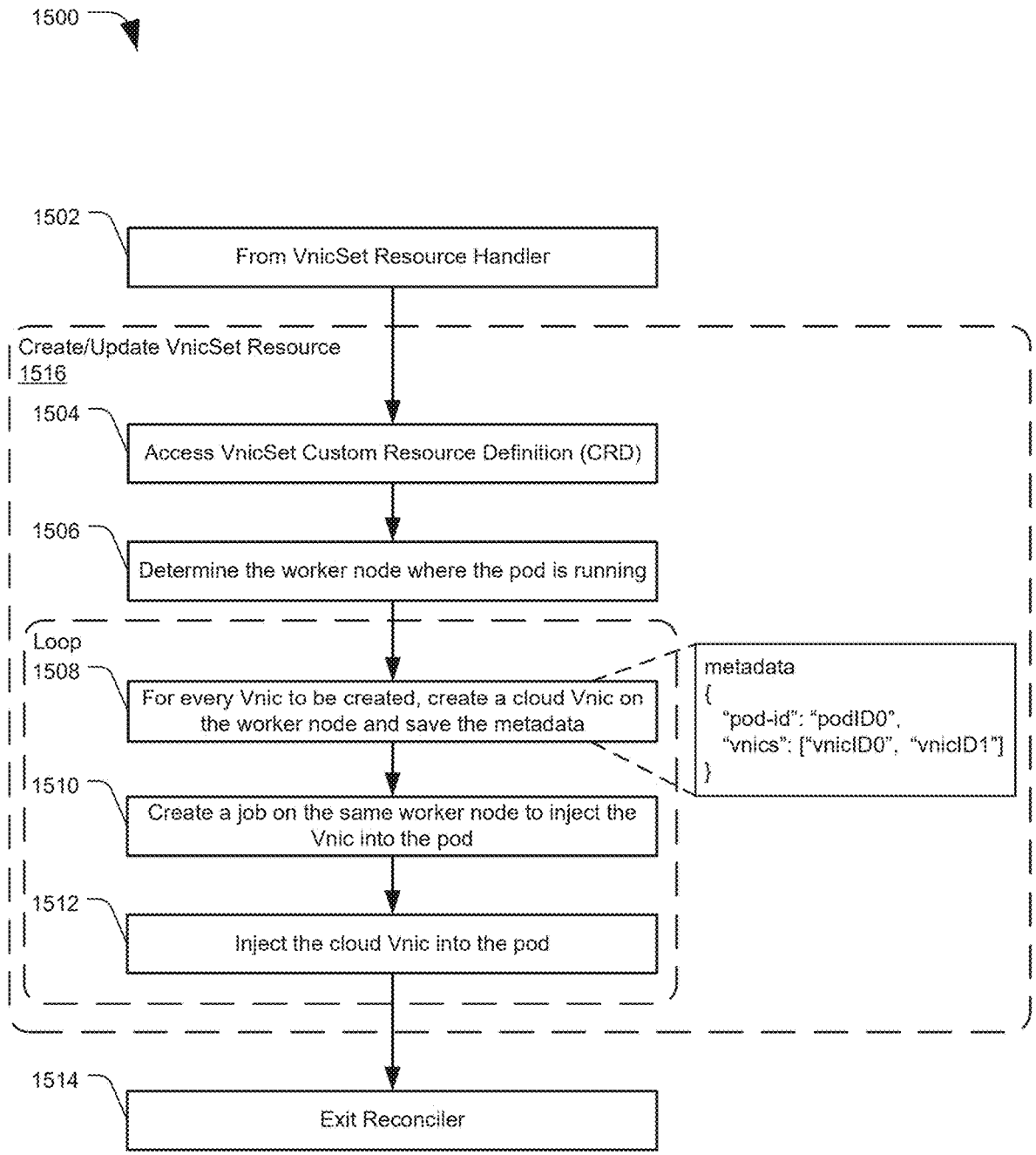
FIG. 15 is a flowchart of an example method for implementing a virtual IP for a container pod, in accordance with certain embodiments of the present disclosure.

Alternately, if the appropriate number of VnicSet resources for each pod have been created, at 1220, the loop may include checking and reconciling a virtual IP address (VIP) associated with the Vnics, at 1228. A determination may be made whether a VIP has changed, at 1230. If not, then no update to the VnicSet resource may be made, at 1232. If the VIP has changed, it may trigger an update VnicSet event, at 1234. Once again, the update event may include the CnApp operator sending or providing an indicator to the Kubernetes control plane for updating a VnicSet resource, which may trigger an event that causes the VnicSet operator to update the specified VnicSet resource. Once the desired VnicSet resources have been created or updated for each pod, the loop may end, and the create or update CnApp resource process 1238 may also end. With the completion of the create or update CnApp resource process 1238, the reconciler process flow may also complete, so the reconciler may exit or loop back to the finalizer, at 1236. FIGS. 13-15 depict example processes for the finalizer 502, stale resource handler 504, and create or update resource module 506 of reconciler 532 for a VnicSet operator 414.

FIG. 13 is a flowchart 1300 of an example method for implementing a virtual IP for a container pod, in accordance with certain embodiments of the present disclosure. In particular, method 1300 may depict an example process flow for a finalizer component 502 of a reconciler module 432 of a VnicSet operator 414. The method may be implemented by the VnicSet operator 414 of FIG. 4, alone or in conjunction with other elements of system 400.

The method may include beginning the reconciler module or process, at 1302. The reconciler process may include a finalizer element (process flow 1326), a stale resource handler element, and a create or update resource element. The elements may each perform a series of status checks and potential changes to a resource, and may be performed in a selected order to remove, add, or adjust resources as appropriate. In the example embodiment of FIGS. 13-15, the order for the reconciler process may begin with the finalizer (FIG. 13), then proceed to the stale resource handler (FIG. 14), and then proceed to the create or update resource handler (FIG. 15) before exiting the reconciler or starting the loop over again.

After starting the reconciler at 1302 and proceeding to the VnicSet finalizer process flow 1326, the method may include checking if the VnicSet resource is marked to be deleted, at 1304. The finalizer 1326 may check if the VnicSet resource is marked for deletion by determining whether Kubernetes has set a deletion timestamp for the resource. Based on the existence of the deletion timestamp, the method may include determining whether the VnicSet resource is marked for deletion, at 1306. If no timestamp is set, the VnicSet resource may not be marked for deletion, and the process may exit the finalizer 1326 and proceed to the stale resource handling module, at 1324.

If the deletion timestamp has been set and the VnicSet resource is marked for deletion, the method may include determining whether the VnicSet object contains a finalizer, at 1308. If not, the resource may not be a custom VnicSet resource, and the method may include exiting the VnicSet reconciler to allow the Kubernetes systems to handle the resource, at 1310. However, if the VnicSet object does contain a finalizer, the method may include reading the VnicSet resource metadata to obtain information such as related Pod ID and Vnic IDs, at 1312.

Based on the metadata, the method may then include checking the pod status for the Pod ID from the metadata, at 1314. A determination may be made whether the status of the pod is terminated or not found, at 1316. If so, the method may include detaching or deleting all Vnic(s) associated with the Pod ID, at 1318, and removing the finalizer to clean up the VnicSet resource, at 1320. However, if the status of the pod is not terminated or not found (e.g., if the pod is still running), the method may include not deleting the Vnic(s) associated with the Pod ID, and requeuing the delete event, at 1322 (e.g., by enabling a 'tombstone' flag). For example, deleting a Vnic on a running pod may interrupt an ongoing operation and cause service loss or errors, and so the deletion may be delayed until the pod is terminated or not found. Once the Vnics have been deleted, or the delete event requeued, the method may exit the finalizer process 1326 and proceed to the stale VnicSet resource handling module, at 1324. The operation of the stale VnicSet resource handler is discussed in regard to the example embodiment of FIG. 14.

FIG. 14 is a flowchart 1400 of an example method for implementing a virtual IP for a container pod, in accordance with certain embodiments of the present disclosure. In particular, method 1400 may depict an example process flow for a stale resource handler component 504 of a reconciler module 432 of a VnicSet operator 414. The method may be implemented by the VnicSet operator 414 of FIG. 4, alone or in conjunction with other elements of system 400.

The process flow of the method may begin where the process flow of the VnicSet finalizer ended, at 1402. At this point the stale VnicSet resource handler process flow 1418 may begin. The method may include reading or obtaining the VnicSet resource metadata, at 1404. The metadata may include information such as related Pod ID and Vnic IDs.

Based on the metadata, the method may then include checking the pod status for the Pod ID from the metadata, at 1406. A determination may be made whether the status of the pod is terminated or not found, at 1408. If so, the method may include detaching or deleting all Vnic(s) associated with the Pod ID, at 1412, and updating the VnicSet resource metadata to reflect the deletion(s), at 1414. However, if the status of the pod is not terminated or not found (e.g., if the pod is still running), the method may include doing nothing, and not deleting or detaching any Vnic(s) for the pod, at 1410. After handling the Vnic(s) based on the pod status, the method may exit the stale VnicSet resource handler process 1418 and proceed to the create or update VnicSet resource module, at 1416. The operation of the create or update VnicSet resource module is discussed in regard to the example embodiment of FIG. 15.

FIG. 15 is a flowchart 1500 of an example method for implementing a virtual IP for a container pod, in accordance with certain embodiments of the present disclosure. In particular, method 1500 may depict an example process flow for a create or update VnicSet resource handler component 506 of a reconciler module 432 of a VnicSet operator 414. The method may be implemented by the VnicSet operator 414 of FIG. 4, alone or in conjunction with other elements of system 400.

The process flow of the method may begin where the process flow of the stale VnicSet resource handler ended, at 1502. At this point the create or update VnicSet resource process flow 1516 may begin. The method may include accessing a VnicSet resource custom resource definition (CRD) file, at 1504, which may indicate a pod for which Vnics are to be created, and how many Vnics to create. The method may include determining the worker node where the designated pod is running, at 1506.

The method may then initiate a loop to process each Vnic to be created for the pod. At 1508, the method may include creating a cloud Vnic on the determined worker node, and saving the metadata for the Vnic (e.g., by associating the Vnic ID for the created Vnic with the Pod ID). The method may then include creating a job on the same worker node to inject the Vnic into the selected pod, at 1510, which may result in the cloud Vnic being injected into the pod, at 1512.

Once the desired Vnics have been inserted into the selected pod, the loop may end, and the create or update VnicSet resource process 1516 may also end. With the completion of the create or update VnicSet resource process 1516, the reconciler process flow may also complete, and the reconciler may exit or loop back to the finalizer, at 1514. The operation of a reconciler 432 and CnApp operator 418 in regard to Service behavior is discussed in regard to FIG. 16.

Figure 16:
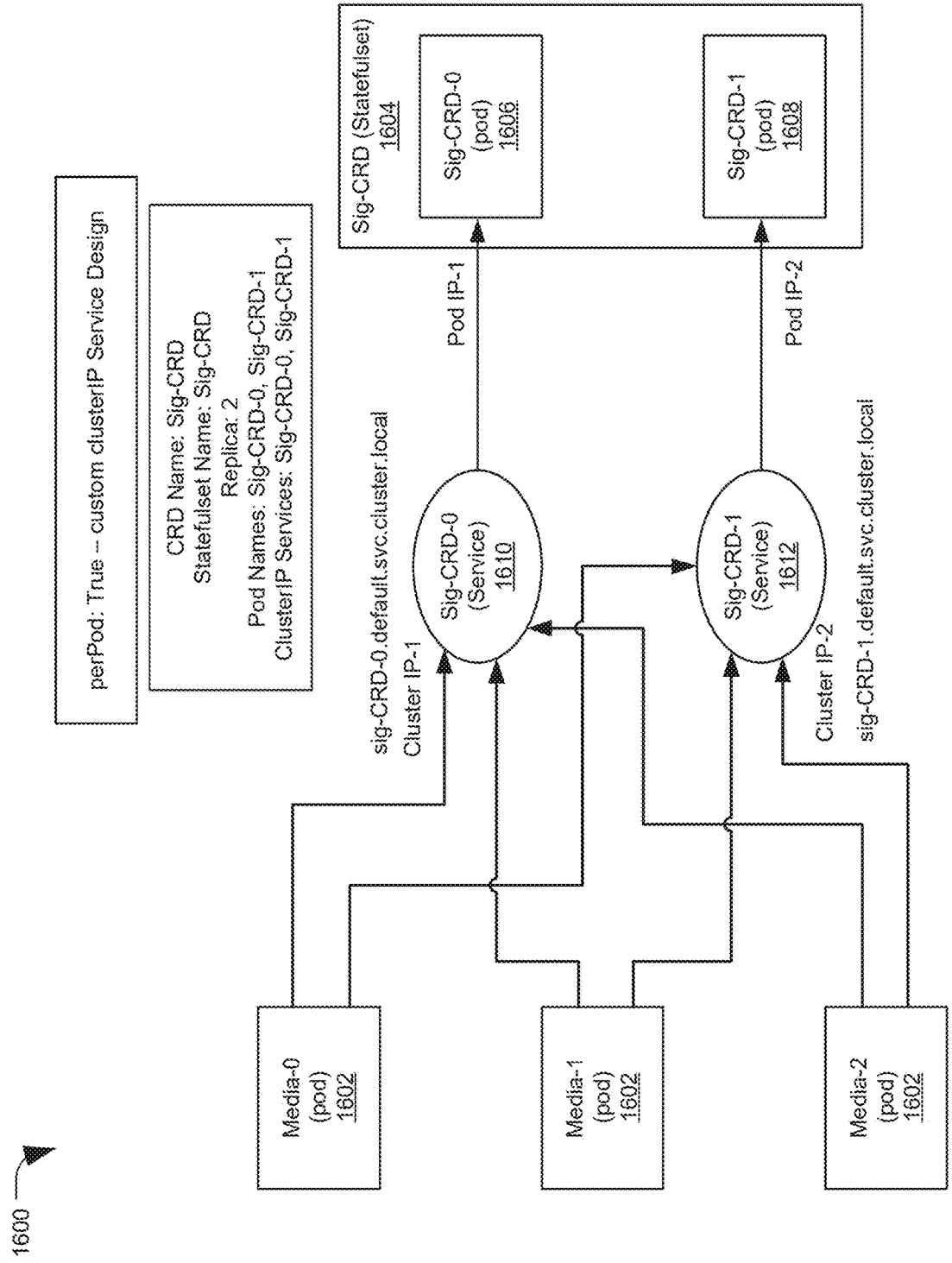
FIG. 16 is a diagram of a system configured to implement a virtual IP for a container pod, in accordance with certain embodiments of the present disclosure.

FIG. 16 depicts a diagram of a system 1600 configured to implement a virtual IP for a container pod, in accordance with certain embodiments of the present disclosure. In particular, the system 1600 may depict an example customizable Service behavior to enable per-pod Service or StatefulSet-based Service. The system 1600 may include a plurality of Media pods 1602 configured for media management, and a StatefulSet Sig-CRD 1604 having a replica count of 2, so as to contain two pods, Sig-CRD-0 1606 and Sig-CRD-1 1608, for signaling management. In the example embodiment of system 1600, each of the signaling pods of StatefulSet 1604 has a corresponding Service, with pod Sig-CRD-0 having Service Sig-CRD-0 1610, and pod Sig-CRD-1 having Service Sig-CRD-1 1612. System 1600 may be implemented and managed via CnApp operator 418 and associated reconciler 432, nodes 422-426, and other components of FIG. 4.

According to default Kubernetes behavior, cluster IP Service support for a StatefulSet (which may contain multiple pods) results in a single Service for all pods of the StatefulSet. A Service in Kubernetes may be a method for exposing a network application that is running as one or more pods in a cluster. So for example, a signaling Service provided by the Sig-CRD StatefulSet 1604 may be made available to other applications (e.g., media pods 1602) or external clients via a signaling Service 1610-1612. In general Kubernetes applications, pods are ephemeral and so the Service for a StatefulSet or Deployment allows frontend pods 1602 to access functionality provided by pods 1606-1608 without keeping track of individual pods and their associated IP addresses that may be changing. However, the solutions provided herein include making pods and their associated IP addresses more consistent and knowable. The CnApp operator 418 may therefore be configured to support customizable Service behavior, either applying the default per-StatefulSet Service functionality of Kubernetes, or to enable per-pod Service functionality.

The CnApp operator 418 CRD yaml file may include a "perPod" variable (e.g., under the Services subsection). When the CnApp reconciler 432 is invoked and perPod is set to False, then a Service may be created having a name set to match the StatefulSet name label, and which would be associated with all pods of that StatefulSet. However, when the CnApp reconciler 432 is invoked and perPod is set to true, or not set (such that the default is perPod=true), then a Service may be created for each pod in the StatefulSet, with the name of each Service set to match the corresponding pod name (e.g., where the pod name may be derived from StatefulSetName-index). The port and other details for the Services may be specified under the Services section of the CnApp CRD yaml file. In the perPod implementation, each front-end pod 1602 may connect to each Service 1610-1612 for accessing the functionality of the pods in the StatefulSet 1604. The process by which virtual IP addresses (VIPs) are assigned to Vnics is discussed in regard to FIGS. 17-19.

Figure 17:
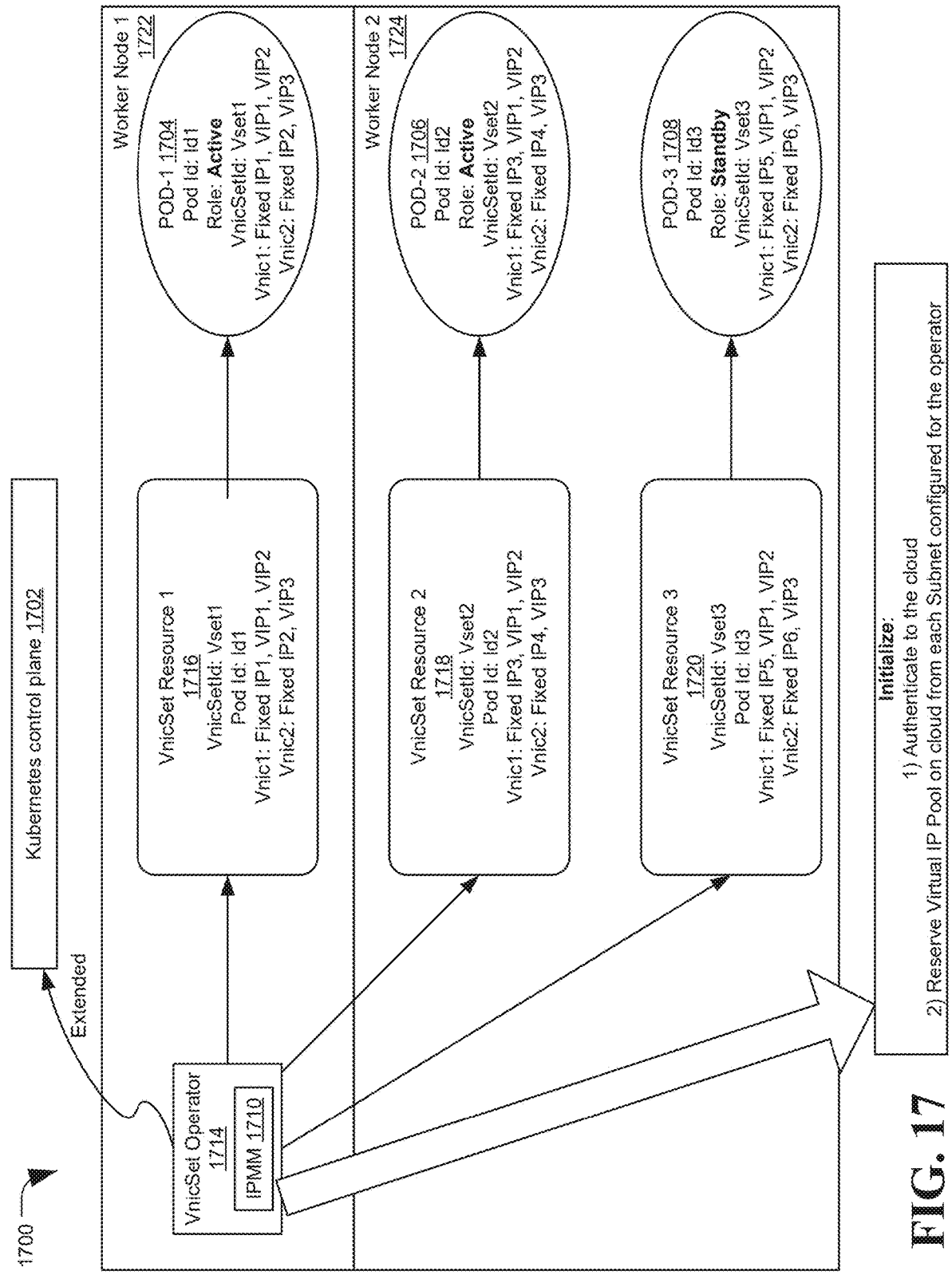
FIG. 17 is a diagram of a system configured to implement a virtual IP for a container pod, in accordance with certain embodiments of the present disclosure.

FIG. 17 depicts a diagram of a system 1700 configured to implement a virtual IP for a container pod, in accordance with certain embodiments of the present disclosure. In particular, the system 1700 may depict an example implementation for providing VIP support in pods in a private environment (as opposed to a public cloud environment). The system 1700 may include a VnicSet operator 1714 that extends the functionality of the Kubernetes control plane 1702. The system 1700 may also include a first worker node, worker node 1 1722, on which a first pod, pod-1 1704 is running. The system 1700 may also include a second worker node, worker node 2 1724, on which a second pod, pod-2 1706, and a third pod, pod-3 1708 are running. The VnicSet operator 1714 may manage a plurality of resources, including VnicSet resource 1 1716 associated with pod-1 1704, VnicSet resource 2 1718 associated with pod-2 1706, and VnicSet resource 3 1720 associated with pod-3 1708. The elements of system 1700 may correspond to or be implemented by elements of system 400.

The first part of the example three-part solution for implementing a cnSBC, as described in regard to FIG. 3, included the CnApp operator 418 bringing up application pods 428 and creating a trigger event for Vnic creation through the generation of VnicSet resource 416. The second part included a VnicSet operator 414 configured to handle the trigger event, and create and inject the Vnics onto the pods 428. The third part includes the VnicSet operator 1714 enabling VIP support on the Vnics, enabling switchover or failover scenarios between pods with fixed VIPs that are always reachable from external networks. The VIPs and failover support may be implemented in an automated manner.

VIP support for pods in StatefulSet, Deployment, Job, or other resources can provide a fixed IP to a pod, even through a pod restart, solving the issue of ephemeral IPs for pods in Kubernetes. Unlike in native Kubernetes networking, VIPs and VMACs (virtual MAC addresses) can also provide high availability (HA) support in pods. HA support can be achieved by assigning the same IP to two or more pods working in active and standby roles (e.g., N active to M standby pods), so that if the active pod fails a standby pod may immediately take over using the same IP address.

Multiple VIP interfaces may be created in a single pod, such as through the injection of multiple Vnics, each having an associated VIP assigned to it, or with a same Vnic having multiple VIPs assigned (e.g., dual stack), or a combination thereof. Example use cases for VIP support may include handling of SIP (session initiation protocol) or RTP (real-time transport protocol) communications, which may require IP addresses to be known at the remote end for communication, and where the IP address should remain consistent during restarts, as SIP messages may be sent on a same IP address.

As described herein, the CnApp operator 418 may generate a pod, determine a number of Vnics that should be included in the pod, and then may generate a VnicSet resource yaml file. Based on the VnicSet resource yaml, the VnicSet operator 1714 may generate the desired number of Vnics on the worker node hosting the identified Pod-ID. In addition, the VnicSet operator may be authenticated by a cloud service provider, and determine at least one fixed IP address, MAC address, VIP(s), and other information to associate with the Vnics. The details of the Vnics may be provided with the VnicSet resource yaml file, assigned by the cloud service provider or DHCP, or a combination thereof.

For example, the VnicSet operator 1714 may reserve a range of IP addresses as an IP pool for each subnet to be used for Vnic injection from the subnet. The IP range may be defined for the VnicSet operator 1714 by a user, in a ConfigMap, in a VnicSet operator definition file, or according to other methods. Once the VnicSet operator 1714 is launched, this range may be allocated and blocked off for VIP management. The VIP pool may be a reserved subset of a larger IP address range that may be used for assigning primary (e.g., fixed) addresses to Vnics, so that primary addresses will not be assigned from the reserved VIP pool. Further, the reserved IP range may be maintained by the VnicSet operator 1714 during restarts, crashes, allocation, deallocation, or reallocation dynamically.

Once a Vnic is created for injection, a VIP may be enabled and associated with the Vnic and pod according to the VnicSet resource CRD definition file. In some examples, all pods associated with a target application may have a Vnic with the same VIP. This VIP may be enabled only on active pods. Multiple Vnics with VIPs could be injected to provide multiple interface support for, e.g., network segregation. A same VIP can be associated with both active and standby pods to make the same interface available during pod switchover or failover events.

In a private environment (e.g., OpenStack), traffic for the assigned VIPs may be handled via GARP (gratuitous address resolution protocol). For example, when the VnicSet operator 1714 makes an OpenStack API call for authentication, it may identify the Vnics and associated fixed and VIPs for both active and standby pods. GARP and ARP (address resolution protocol) tables may handle which VIPs are active on which pods. For example, when multiple active pods have Vnics with the same VIPs, GARP may handle which traffic is routed to which Vnic and pod. GARP may also automatically manage the transition from standby to active, and ARP tables may be updates when a pod goes inactive or active. For example, if pod 2 1706 were to crash and pod 3 1708 transitions to active to compensate, an internal GARP request may be issued that activates the VIPs assigned to the newly activated pod. Accordingly, GARP may ensure pod 3 1708 would start receiving the appropriate traffic using the same VIPs as the pod that went down.

An example VnicSet resource type schema for Kubernetes may include:

```
type VnicSetResource {
    // Pod Name to which Vnics will be attached
    PodName string 'json:"podname"'
    // Pod ID to which Vnics will be attached
    PodID string 'json:"podid"'
    // Array of Vnics
    Vnics [ ]VnicType 'json:"vnics"'
}
//VnicType Data
type VnicType struct {
    // Network Name
    NetworkName string 'json:"network-name"'
    // List of Secondary Ips/Virtual IPs
    VirtualIPs [ ]string 'json:"virtualIps"'  <<<< VIP Support
}
```

An example CRD resource definition file for VnicSet may include:

```
apiVersion: <group>/<domain.com>/v1
kind: VnicSet
spec:
    podid: <pod-id>
    podname: <pod-name>
    vnics:
    - network-name: <network-name-1>
      fixedIP: <IP1>
      VirtualIps: <IP List>  <<< VIP Support
    - network-name: <network-name-2>
      fixedIP: <IP2>
      VirtualIps: <IP List>  <<< VIP Support
```

The primary or fixed IPs of the Vnics could optionally be provided to the VnicSet operator 1714 from the CnApp operator 418. Note that if an IP is not provided in the CRD file, then an IP address may be dynamically allocated via DHCP that is also an externally reachable IP. Multiple VIPs may be allocated to a single Vnic, in addition to a fixed IP. The primary IPs may be assigned from a first allocated range, and the secondary IP range (e.g., provided in the ConfigMap) may be reserved by an IP management module (IPMM) 1710 of the VnicSet operator 1714 for application usage as VIPs only.

During initialization of the VnicSet operator 171, the IPMM 1710 may reserve the pool of Virtual/secondary IPs to ensure that the network shall not assign an overlapping IP to an interface (e.g., assigning a primary IP from the VIP pool). Once reserved, these IPs may only be used within the purview of the VnicSet operator. There can be a fixed naming convention for creating a Vnic, port, or interface to ensure that the port can be retrieved in the event the VnicSet operator 1714 reboots. For example, the combination of "Name", "DeviceOwner", and "DeviceID" can be set during the creation of the port to ensure that it will be unique while retrieving the port. The following is an example naming convention that can be used while creating the port:

Name: VnicSet-Operator-<Operator name as mentioned in the deployment>-Port
DeviceOwner: VnicSet-Operator
DeviceID: VnicSet-Operator-network-name When the VnicSet operator 1714 receives a create event with a CRD specification including an identified pod 1704 and associated Vnic details, it may identify the worker node 1722 on which the pod 1704 is running. The VnicSet operator 1714 may create the Vnic(s) (e.g., Vnic1 and Vnic2) on that worker node 1722, and associate the configured primary (fixed) and secondary (virtual) IP(s) from the CRD specification with the Vnic(s). The VnicSet operator 1714 may create a job to inject the created Vnics from the worker node 1722 into the pod 1704. In the depicted example, the VnicSet operator 1714 may generate VnicSet resource 1 1716 for Pod-1 1704, detailing Vnic1 being associated with Fixed IP1, VIP1, and VIP2, and Vnic2 being associated with Fixed IP2 and VIP3. As pod 2 1706 and pod 3 1708 may be associated with a same application as pod 1 1704, the Vnics 1 and 2 for those pods may also be associated with VIPs 1, 2, and 3, but have different fixed IPs. The VnicSet operator 1714 may monitor the pods 1704-1708 for lifecycle events, and if a pod is restarted, the operator 1714 may associate a same VIP to the created Vnic on the target worker node and inject it into the restarted pod.

When the VnicSet operator 1714 receives an update event CRD, in the event of an administrator updating the VIP set in any of the networks, the VnicSet operator 1714 may monitor this change and update the IP addresses in associated Vnics (e.g., by modifying the VnicSet resource files 1716-1720, by deleting the existing Vnics and creating new ones, or by creating and adding new Vnics to an existing pod). In the event the VnicSet operator 1714 reboots, the IPMM 1710 may be capable of retrieving the created Vnic or port information from the hypervisor and making new records for the retrieved Vnic IDs. This information may be used to delete associated ports during operator cleanup operations.

Figure 18:
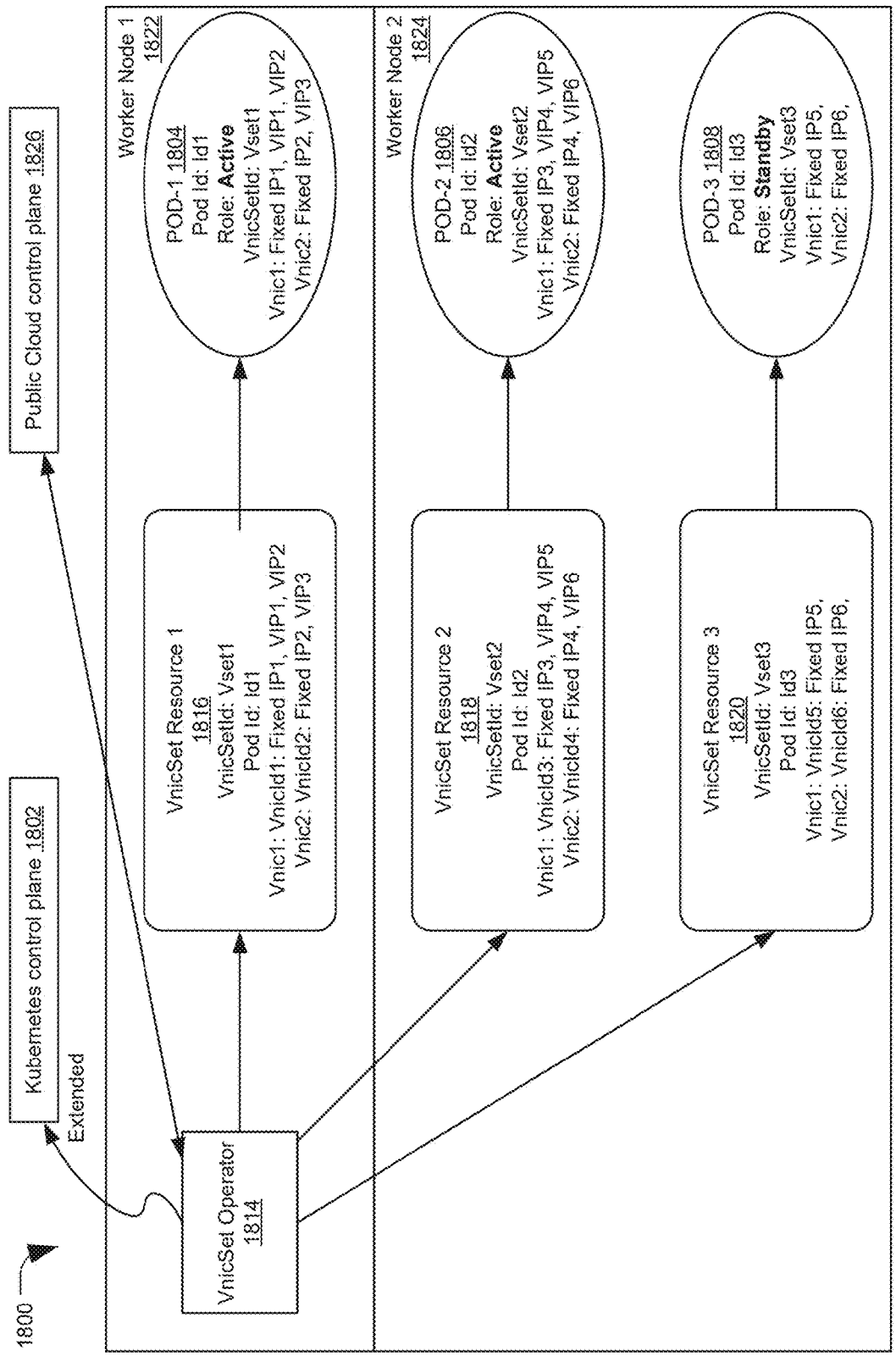
FIG. 18 is a diagram of a system configured to implement a virtual IP for a container pod, in accordance with certain embodiments of the present disclosure.
Figure 19:
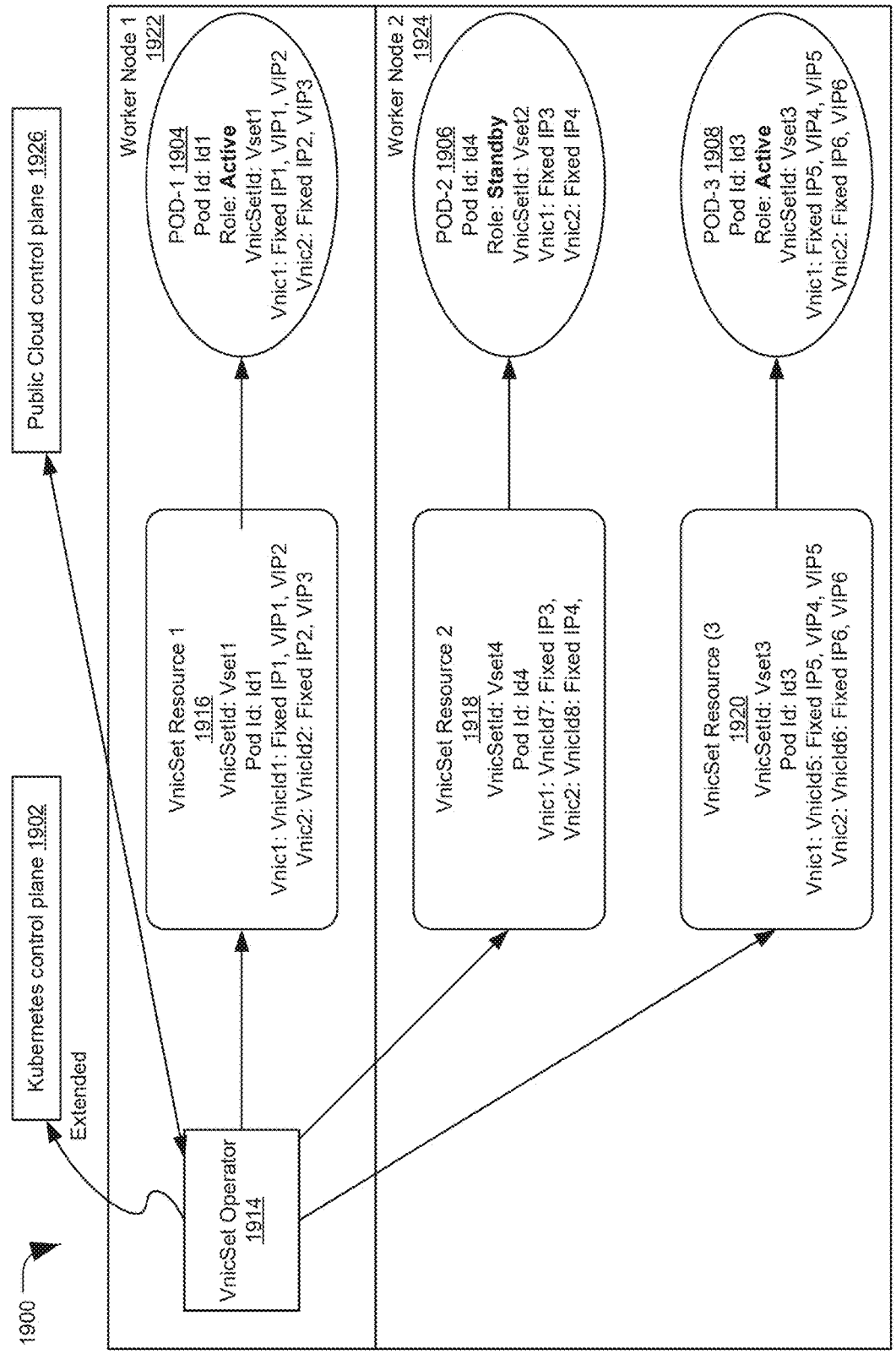
FIG. 19 is a diagram of a system configured to implement a virtual IP for a container pod, in accordance with certain embodiments of the present disclosure.

In the depicted example of system 1700, pod 1 1704 and pod 2 1706 may be in an active state, while pod 3 1708 may be in a standby state. This may provide an N:M ratio of active:standby pods of 2:1. If either pod 1 1704 or pod 2 1706 should crash, pod 3 1708 may switch from a standby state to an active state. For example, an application controller may detect a crash and pass it to Kubernetes via a service manager. Because pod 3 1708 shares the VIP addresses with pod 1 1704 and pod 2 1706, it may immediately pick up traffic that would have been handled by the crashed pod while it restarts (e.g., as handled by GARP and updating ARP tables). FIGS. 18-19 address the application of Vnics and VIPs in a public cloud environment that may not rely on GARP.

FIG. 18 depicts a diagram of a system 1800 configured to implement a virtual IP for a container pod, in accordance with certain embodiments of the present disclosure. In particular, the system 1800 may depict an example implementation for providing VIP support in pods in a public cloud environment (as opposed to a private environment). The system 1800 may include a VnicSet operator 1814 that extends the functionality of the Kubernetes control plane 1802, and interacts with a public cloud control plane 1826. The system 1800 may also include a first worker node, worker node 1 1822, on which a first pod, pod-1 1804 is running. The system 1800 may also include a second worker node, worker node 2 1824, on which a second pod, pod-2 1806, and a third pod, pod-3 1808 are running. The VnicSet operator 1814 may manage a plurality of resources, including VnicSet resource 1 1816 associated with pod-1 1804, VnicSet resource 2 1818 associated with pod-2 1806, and VnicSet resource 3 1820 associated with pod-3 1808. The elements of system 1800 may correspond to or be implemented by elements of system 400.

In a public cloud environment, including for example platforms such as OCI (Oracle Cloud Infrastructure), AWS (Amazon Web Services), and Microsoft Azure, the mechanism by which Vnics are created may differ from a private environment. Further, the public cloud implementation may not rely on GARP to handle the switching of traffic between crashed active pods to standby pods. Instead, the VnicSet operator 1814 may make specific requests to the public cloud control plane 1826 to enable or disable particular VIPs on a pod. Accordingly, dynamic automated solutions to create pods with externally reachable interfaces, with restart- and switchover-resilient IP addresses, having the same ingress and egress paths that bypass the Kubernetes load balancer, can be achieved in both private environments and in public cloud platforms. Examples provided herein may be for a StatefulSet resource, but the ideas may be extended to Deployments or other resources.

In a public cloud environment, the VnicSet operator 1814 may perform the same operations discussed above in regard to managing VnicSet resources, and watching target pod(s) for lifecycle events and taking action accordingly via a reconciler. The VnicSet operator 1814 may still enable and associate VIPs with Vnics and inject the Vnics into the pods.

However, distinctions may also exist. The primary or fixed IP for a Vnic may be a mandatory field in the VnicSet resource CRD file, rather than being an optional field. The VnicSet operator 1814 may authenticate to the public cloud (rather than to a private cloud environment). Once a Vnic is created for injection, the VnicSet operator 1814 may request to the public cloud 1826 to enable and associate a VIP with the Vnic ID for the active pods 1804-1806 only (e.g., as opposed to a private environment on which VIPs may be associated with standby pods, and the standby to active switch may be automatically handled via GARP). The active pods 1804-1806 may be determined based on an active: standby count provided in the CnApp resource CRD file, which may have fields for active count and standby count for pods. If the public cloud 1826 does enable the VIP for the Vnic, the VnicSet operator 1814 reconciler may continue to the next operation. However, in case of failure, the VnicSet operator 1814 reconciler may cleanup the Vnic and requeue the request for reconciliation. During pod restarts, updates, or crashes, when an active pod 1804-1806 goes down, the VnicSet operator 1814 may request the public cloud control plane 1826 to associate the VIPs of the old active pod 1804-1806 to the standby pod 1808 which will take over the role of active pod that went down. Meanwhile, the old active pod may be respawned as a standby pod having Vnics without VIPs.

In the example of system 1800, the VnicSet operator 1814 may detect create notifications for Vnics on the pods 1804-1808, with CRDs that specify the fixed IP values for the Vnics. Accordingly, VnicSet resource 1 1816 may have Vnic1 (having VnicId1) associated with fixed IP1, and VnicId2 associated with fixed IP2; VnicSet resource 2 1818 may have VnicId3 associated with fixed IP3, and VnicId4 associated with fixed IP4; and VnicSet resource 3 1820 may associate VnicId5 with fixed IP5, and VnicId6 associated with fixed IP6.

The VnicSet operator 1814 may send a request to the public cloud control plane 1826 to associate VIPs with active pod Vnics, based on an active:standby ratio. The VnicSet operator 1814 may specify which VIPs to associate with which Vnics, for example based on information provided in the CnApp resource CRD file and provided to the VnicSet operator in a VnicSet resource CRD file. In this case, the request to the public cloud control plane may be to associate VnicId1 with VIP1 and VIP2; to associate VnicId2 with VIP3; to associate VnicId3 with VIP4 and VIP5; and to associate VnicId4 with VIP 6. VnicId5 and VnicId6, of standby pod 3 1808, may have no VIPs association requests. The public cloud control plane 1826 may provide a success response (or alternately, a failure response or no response, for which the VnicSet operator 1814 may cleanup the Vnic(s) and requeue the association request. Upon successful association, the fixed IPs and VIPs may be associated with the Vnics as depicted in system 1800, and the Vnics may be injected into the associated pods 1804-1808 by the VnicSet operator 1814.

Now assume that pod 2 1806 crashes. The VnicSet operator 1814 may detect the event, and its reconciler may delete the associate VnicSet resource 2 1818, so that the Vnics (VnicId3 and VnicId4) are released. The recovery from the crash is discussed in regard to FIG. 19.

FIG. 19 depicts a diagram of a system 1900 configured to implement a virtual IP for a container pod, in accordance with certain embodiments of the present disclosure. In particular, the system 1900 may depict an example implementation for handling a switchover or failover event between active and standby pods in a public cloud environment. The system 1900 may include a VnicSet operator 1914 that extends the functionality of the Kubernetes control plane 1902, and interacts with a public cloud control plane 1926. The system 1900 may also include worker node 1 1922, on which pod-1 1904 is running, and worker node 2 1924, on which pod-2 1906 and pod-3 1908 are running. The VnicSet operator 1914 may manage a plurality of resources, including VnicSet resource 1 1916 associated with pod-1 1904, VnicSet resource 2 1918 associated with pod-2 1906, and VnicSet resource 3 1920 associated with pod-3 1908. The elements of system 1900 may correspond to or be implemented by elements of system 400 and system 1800.

After pod 2 1906 crashes and is deleted, pod 2 1906 may be respawned (e.g., by a CnApp operator). The newly spawned pod 2 1906 may have a new pod id, pod-id4. The VnicSet operator 1914 may create a new VnicSet resource 2 1918, and create new Vnics on worker node 2 1924 where pod 2 1906 has respawned. The new Vnics may have new VnicIds (e.g., VnicId7 and VnicId8), but the same fixed IPs (fixed IP3, and fixed IP4). The role or status of pod 2 1906 may be switched from Active to Standby.

Pod 3 1908 may take over the role of Active, and the VnicSet operator 1914 may issue a request to the public cloud control plane 1926 to associate VnicId5 with VIP4 and VIP5, and VnicId6 with VIP6, which had previously been associated with pod 2 1906. Pod 2 1906 may now have no associated VIPs. Pod 3 1908 may therefore take over handling of calls or messaging that had been handled by pod 2 1906 before the crash, without an interruption in service.

The VnicSet operator 1914 may also reach out to the public cloud control plane 1926 when VIPs must otherwise be adjusted. For example, in the event of an operator CRD update where the administrator updates the reserved VIP set in any of the networks, the VnicSet operator 1914 may monitor this change and request public cloud control plane 1926 to update the IP addresses in associated Vnic(s). A computing system configured to perform the operations of the methods of the foregoing figures and descriptions is described in regard to FIG. 20.

Figure 20:
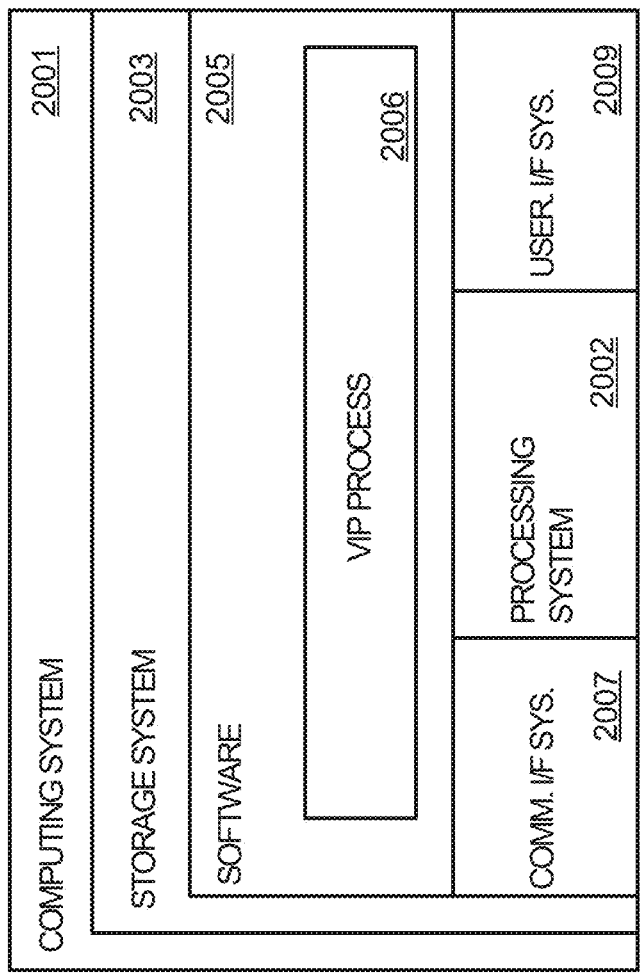
FIG. 20 is a diagram of a system configured to implement a virtual IP for a container pod, in accordance with certain embodiments of the present disclosure.

FIG. 20 illustrates an apparatus 2000 including a computing system 2001 that is representative of any system or collection of systems in which the various processes, systems, programs, services, and scenarios disclosed herein may be implemented. For example, computing system 2001 may be an example of network 106 or Kubernetes environment 102 of FIG. 1, or control plane 402, application plane 406, worker nodes 422-426, VnicSet operator 414, CnApp operator 418, API server 410, or other components of FIG. 4, or any combination thereof. Examples of computing system 2001 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 2001 may be implemented as a single apparatus, system, or device or may be implemented in a distributed manner as multiple apparatuses, systems, or devices. Computing system 2001 may include, but is not limited to, processing system 2002, storage system 2003, software 2005, communication interface system 2007, and user interface system 2009. Processing system 2002 may be operatively coupled with storage system 2003, communication interface system 2007, and user interface system 2009.

Processing system 2002 may load and execute software 2005 from storage system 2003. Software 2005 may include and implement a VIP process 2006, which may be representative of any of the operations for implementing externally accessible, persistent-IP interfaces for containerized software environments, as discussed with respect to the preceding figures. When executed by processing system 2002, software 2005 may direct processing system 2002 to operate as described herein for at least the various processes, operational scenarios, and sequences discussed in the foregoing implementations. Computing system 2001 may optionally include additional devices, features, or functionality not discussed for purposes of brevity.

In some embodiments, processing system 2002 may comprise a micro-processor and other circuitry that retrieves and executes software 2005 from storage system 2003. Processing system 2002 may be implemented within a single processing device but may also be distributed across multiple processing devices or sub-systems that cooperate in executing program instructions. Examples of processing system 2002 may include general purpose central processing units, graphical processing units, application specific processors, and logic devices, as well as any other type of processing device, combinations, or variations thereof.

Storage system 2003 may comprise any memory device or computer readable storage media readable by processing system 2002 and capable of storing software 2005. Storage system 2003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 2003 may also include computer readable communication media over which at least some of software 2005 may be communicated internally or externally. Storage system 2003 may be implemented as a single storage device but may also be implemented across multiple storage devices or sub-systems co-located or distributed relative to each other. Storage system 2003 may comprise additional elements, such as a controller, capable of communicating with processing system 2002 or possibly other systems.

Software 2005 (including VIP process 2006 among other functions) may be implemented in program instructions that may, when executed by processing system 2002, direct processing system 2002 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 2005 may include additional processes, programs, or components, such as operating system software, virtualization software, or other application software. Software 2005 may also comprise firmware or some other form of machine-readable processing instructions executable by processing system 2002.

In general, software 2005 may, when loaded into processing system 2002 and executed, transform a suitable apparatus, system, or device (of which computing system 2001 is representative) overall from a general-purpose computing system into a special-purpose computing system customized to implement the systems and processes as described herein. Indeed, encoding software 2005 on storage system 2003 may transform the physical structure of storage system 2003. The specific transformation of the physical structure may depend on various factors in different implementations of this description. Examples of such factors may include, but are not limited to, the technology used to implement the storage media of storage system 2003 and whether the computer-storage media are characterized as primary or secondary storage, as well as other factors.

For example, if the computer readable storage media are implemented as semiconductor-based memory, software 2005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 2007 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 2001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," "including," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. Except when used for the selection or determination between alternatives, the word "or" in reference to a list of two or more items covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A cloud based network system, comprising:
one or more processors;
a memory having stored thereon instructions that, upon execution by the one or more processors, cause the one or more processors to implement a process to assign a virtual internet protocol (VIP) address to an application pod of a containerized software environment, the VIP address being directly reachable from a network external to the containerized software environment, the process including:
reserve a range of internet protocol (IP) addresses for use as VIP addresses;
assign a first fixed IP address to a first application pod;
assign a first VIP address from the range of IP addresses to the first application pod;
route traffic directed to the first VIP address to the first fixed IP address;
determine when the first application pod has restarted as a new application pod;
assign a new fixed IP address to the new application pod; and
assign the first VIP address to the new application pod, the first VIP address configured to route traffic to the new fixed IP address, enabling continued access to a service offered by the first application pod and the new application pod through the first VIP address, despite the first application pod and the new application pod having different fixed IP addresses.

2. The cloud based network system of claim 1, further comprising instructions that, upon execution, cause the one or more processors to:
assign a virtual network interface controller (Vnic) to the first application pod to act as an externally-accessible port not managed by the containerized software environment;
assign the first fixed IP address to the Vnic; and
assign the first VIP address to the Vnic in order to route traffic directed to the first VIP address to be received at the first fixed IP address.

3. The cloud based network system of claim 1, further comprising instructions that, upon execution, cause the one or more processors to:
assign the first application pod to an active role;
assign a second fixed IP address to a second application pod;
assign the second application pod to a standby role; and
switch the second application pod from the standby role to the active role in response to the first application pod crashing.

4. The cloud based network system of claim 3, further comprising instructions that, upon execution, cause the one or more processors to:
determine when the first application pod has crashed; and
in response to the first application pod crashing, assign the first VIP address to the second application pod, the first VIP address configured to route traffic to the second fixed IP address.

5. The cloud based network system of claim 4, further comprising instructions that, upon execution, cause the one or more processors to:
operate the cloud based network system on a public cloud environment;
request that a public cloud operator associate the first VIP address with the first application pod; and
in response to the first application pod crashing, request that the public cloud operator associate the first VIP address with the second application pod.

6. The cloud based network system of claim 3, further comprising instructions that, upon execution, cause the one or more processors to:
assign the first VIP address to the second application pod;
route traffic directed to the first VIP address to the first fixed IP address while the first application pod is running; and
route traffic directed to the first VIP address to the second fixed IP address in response to the first application pod crashing.

7. The cloud based network system of claim 6, further comprising instructions that, upon execution, cause the one or more processors to:
operate the cloud based network system on a private cloud environment; and
route traffic directed to the first VIP address to be received at the first fixed IP address or the second fixed IP address based on a gratuitous address resolution protocol (GARP).

8. The cloud based network system of claim 7, further comprising instructions that, upon execution, cause the one or more processors to:
assign a third fixed IP address to a third application pod;
assign the first VIP address to the first application pod, to the second application pod, and to the third application pod, the first application pod and the third application pod both being in the active role and the second application pod being in the standby role;
assign a second VIP address to the first application pod, to the second application pod, and to the third application pod;
route traffic to the first fixed IP address and the third fixed IP address via the first VIP address and the second VIP address while both first and third application pods are active based on the GARP; and
when either the first application pod or the third application pod crashes, route traffic intended for the crashed pod to the second fixed IP address based on the GARP.

9. The cloud based network system of claim 1, further comprising the containerized software environment includes a Kubernetes cluster.

10. A method comprising:
operating a cloud based network system in a containerized software environment to assign a virtual internet protocol (VIP) address to an application pod of a containerized software environment, the VIP being directly reachable from a network external to the containerized software environment, including:
reserving a range of internet protocol (IP) addresses for use as VIP addresses;
assigning a first fixed IP address to a first application pod;
assigning a first VIP address from the range of IP addresses to the first application pod;
routing traffic directed to the first VIP address to the first fixed IP address;
determining when the first application pod has restarted as a new application pod;
assigning a new fixed IP address to the new application pod; and
assigning the first VIP address to the new application pod, the first VIP address configured to route traffic to the new fixed IP address.

11. The method of claim 10 further comprising:
assigning a virtual network interface controller (Vnic) to the first application pod to act as an externally-accessible port not managed by the containerized software environment;
assigning the first fixed IP address to the Vnic; and
assigning the first VIP address to the Vnic in order to route traffic directed to the first VIP address to be received at the first fixed IP address.

12. The method of claim 10 further comprising:
assigning the first application pod to an active role;
assigning a second fixed IP address to a second application pod;
assigning the second application pod to a standby role; and
switching the second application pod from the standby role to the active role in response to the first application pod crashing.

13. The method of claim 12 further comprising:
determining when the first application pod has crashed; and
in response to the first application pod crashing, assigning the first VIP address to the second application pod, the first VIP address configured to route traffic to the second fixed IP address.

14. The method of claim 13 further comprising:
operating the cloud based network system on a public cloud environment;
requesting that a public cloud operator associate the first VIP address with the first application pod; and
in response to the first application pod crashing, requesting that the public cloud operator associate the first VIP address with the second application pod.

15. The method of claim 12 further comprising:
assigning the first VIP address to the second application pod;
routing traffic directed to the first VIP address to the first fixed IP address while the first application pod is running; and
routing traffic directed to the first VIP address to the second fixed IP address in response to the first application pod crashing.

16. The method of claim 15 further comprising:
operating the cloud based network system on a private cloud environment; and
routing traffic directed to the first VIP address to be received at the first fixed IP address or the second fixed IP address based on a gratuitous address resolution protocol (GARP).

17. The method of claim 16 further comprising:
assigning a third fixed IP address to a third application pod;
assigning the first VIP address to the first application pod, to the second application pod, and to the third application pod, the first application pod and the third application pod both being in the active role and the second application pod being in the standby role;
assigning a second VIP address to the first application pod, to the second application pod, and to the third application pod;
routing traffic to the first fixed IP address and the third fixed IP address via the first VIP address and the second VIP address while both first and third application pods are active based on the GARP; and
when either the first application pod or the third application pod crashes, routing traffic intended for the crashed pod to the second fixed IP address based on the GARP.

18. The method of claim 10, further comprising the containerized software environment includes a Kubernetes cluster.

* * * * *

UNITED STATES PATENT AND TRADEMARK OFFICE
CERTIFICATE OF CORRECTION

PATENT NO. : 12,323,386 B2
APPLICATION NO. : 18/351835
DATED : June 3, 2025
INVENTOR(S) : Juneja et al.

Page 1 of 1

It is certified that error appears in the above-identified patent and that said Letters Patent is hereby corrected as shown below:

In the Specification

In Column 1, Line 17, delete "(VOIP)," and insert -- (VoIP), --, therefor.

In Column 5, Line 56, delete "VOIP" and insert -- VoIP --, therefor.

In Column 12, Line 31, delete "Vnic." and insert -- Vnic, --, therefor.

In Column 15, Line 8, delete "PVC." and insert -- PVC, --, therefor.

In Column 15, Line 43, delete "controller. Options setting." and insert -- controller.Options setting. --, therefor.

In Column 16, Line 44, delete "PVC." and insert -- PVC, --, therefor.

In Column 17, Line 51, delete "pods." and insert -- pods, --, therefor.

In Column 18, Lines 11-12, delete "VnicSetResource App" and insert -- VnicSetResourceApp --, therefor.

Signed and Sealed this
Twelfth Day of August, 2025

Coke Morgan Stewart
*Acting Director of the United States Patent and Trademark Office*